US007173977B2

(12) United States Patent
Chen et al.

(10) Patent No.: US 7,173,977 B2
(45) Date of Patent: Feb. 6, 2007

(54) METHOD AND APPARATUS FOR TAILORING CARRIER POWER REQUIREMENTS ACCORDING TO AVAILABILITY IN LAYERED MODULATION SYSTEMS

(75) Inventors: Ernest C. Chen, San Pedro, CA (US); Paul R. Anderson, Hermosa Beach, CA (US); Joseph Santoru, Agoura Hills, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 13 days.

(21) Appl. No.: 10/532,582

(22) PCT Filed: Oct. 15, 2003

(86) PCT No.: PCT/US03/32751

§ 371 (c)(1),
(2), (4) Date: Apr. 25, 2005

(87) PCT Pub. No.: WO2004/040924

PCT Pub. Date: May 13, 2004

(65) Prior Publication Data

US 2006/0153314 A1 Jul. 13, 2006

Related U.S. Application Data

(60) Provisional application No. 60/421,333, filed on Oct. 25, 2002.

(51) Int. Cl.
*H04L 27/04* (2006.01)
(52) U.S. Cl. .................................................. 375/295
(58) Field of Classification Search ................. 375/222, 375/285, 295, 296
See application file for complete search history.

(56) References Cited

U.S. PATENT DOCUMENTS 3,383,598 A 5/1968 Sanders (Continued)

FOREIGN PATENT DOCUMENTS

DE 3642213 A1 12/1986

(Continued)

OTHER PUBLICATIONS

Fang, T. et al.; "Fourth-Power Law Clock Recovery with Prefiltering", Proceedings of the International Conference on Communications (ICC), Geneva, May 23-26, 1993, New York, IEEE, US, vol. 3, May 23, 1993, pp. 811-815, XP010137089, ISBN:0-7803-0950-2, Section I, Introduction.

(Continued)

*Primary Examiner*—Don N. Vo
(74) *Attorney, Agent, or Firm*—Georgann S. Grunebach

(57) ABSTRACT

A method and apparatus transmitting a layered modulation signal having a first signal layer having first signal symbols and a second signal layer having second signal symbols is disclosed. The method comprises the steps of determining a first signal layer modulation carrier power $C_L$ at least in part according to a first signal layer clear sky margin $M_L$ and a first signal layer availability, determining an second signal layer modulation carrier power $C_U$ at least in part according to an second signal layer clear sky margin $M_U$ and an second signal layer availability, modulating the first signal symbols according to a first carrier at the determined first signal layer modulation carrier power; modulating the second signal symbols according to a second carrier at the determined second signal layer modulation carrier power, and transmitting the two layers independently.

37 Claims, 19 Drawing Sheets

U.S. PATENT DOCUMENTS

| | | |
|---|---|---|
| 3,878,468 A | 4/1975 | Falconer et al. |
| 3,879,664 A | 4/1975 | Monsen |
| 3,974,449 A | 8/1976 | Falconer |
| 4,039,961 A | 8/1977 | Ishio et al. |
| 4,068,186 A | 1/1978 | Sato et al. |
| 4,213,095 A | 7/1980 | Falconer |
| 4,253,184 A | 2/1981 | Gitlin et al. |
| 4,283,684 A | 8/1981 | Satoh |
| 4,384,355 A | 5/1983 | Werner |
| RE31,351 E | 8/1983 | Falconer |
| 4,416,015 A | 11/1983 | Gitlin |
| 4,500,984 A | 2/1985 | Shimbo et al. |
| 4,519,084 A | 5/1985 | Langseth |
| 4,594,725 A | 6/1986 | Desperben et al. |
| 4,628,507 A | 12/1986 | Otani |
| 4,637,017 A | 1/1987 | Assal et al. |
| 4,647,873 A | 3/1987 | Beckner et al. |
| 4,654,863 A | 3/1987 | Belfield et al. |
| 4,670,789 A | 6/1987 | Plume |
| 4,709,374 A | 11/1987 | Farrow |
| 4,800,573 A | 1/1989 | Cupo |
| 4,835,790 A | 5/1989 | Yoshida et al. |
| 4,847,864 A | 7/1989 | Cupo |
| 4,860,315 A | 8/1989 | Hosoda et al. |
| 4,878,030 A | 10/1989 | Vincze |
| 4,896,369 A | 1/1990 | Adams, Jr. et al. |
| 4,918,708 A | 4/1990 | Pottinger et al. |
| 4,993,047 A | 2/1991 | Moffat et al. |
| 5,088,110 A | 2/1992 | Bonnerot et al. |
| 5,111,155 A | 5/1992 | Keate et al. |
| 5,121,414 A | 6/1992 | Levine et al. |
| 5,199,047 A | 3/1993 | Koch |
| 5,221,908 A | 6/1993 | Katz et al. |
| 5,229,765 A | 7/1993 | Gardner |
| 5,233,632 A | 8/1993 | Baum et al. |
| 5,285,480 A | 2/1994 | Chennakeshu et al. |
| 5,317,599 A | 5/1994 | Obata |
| 5,329,311 A | 7/1994 | Ward et al. |
| 5,430,770 A | 7/1995 | Abbey |
| 5,450,623 A | 9/1995 | Yokoyama et al. |
| 5,467,197 A | 11/1995 | Hoff |
| 5,493,307 A | 2/1996 | Tsujimoto |
| 5,555,257 A | 9/1996 | Dent |
| 5,557,067 A | 9/1996 | Zimmerman |
| 5,577,067 A | 11/1996 | Zimmerman |
| 5,577,087 A | 11/1996 | Furuya |
| 5,579,344 A | 11/1996 | Namekata |
| 5,581,229 A | 12/1996 | Hunt |
| 5,602,868 A | 2/1997 | Wilson |
| 5,603,084 A | 2/1997 | Henry et al. |
| 5,606,286 A | 2/1997 | Bains |
| 5,625,640 A | 4/1997 | Palmer et al. |
| 5,642,358 A | 6/1997 | Dent |
| 5,648,955 A | 7/1997 | Jensen et al. |
| 5,732,113 A | 3/1998 | Schmidl et al. |
| 5,793,818 A | 8/1998 | Claydon et al. |
| 5,815,531 A | 9/1998 | Dent |
| 5,819,157 A | 10/1998 | Ben-Efraim et al. |
| 5,828,710 A | 10/1998 | Beale |
| 5,848,060 A | 12/1998 | Dent |
| 5,870,443 A | 2/1999 | Rahnema |
| 5,940,025 A | 8/1999 | Koehnke et al. |
| 5,956,373 A | 9/1999 | Goldston et al. |
| 5,960,040 A | 9/1999 | Cai et al. |
| 5,963,845 A | 10/1999 | Floury et al. |
| 5,966,048 A | 10/1999 | Thompson |
| 5,966,186 A | 10/1999 | Shigihara et al. |
| 5,966,412 A | 10/1999 | Ramaswamy |
| 5,970,098 A | 10/1999 | Herzberg |
| 5,995,832 A | 11/1999 | Mallinckrodt |
| 6,987,068 B2 | 11/1999 | Cassia et al. |
| 5,999,793 A | 12/1999 | Ben-Efraim et al. |
| 6,008,692 A | 12/1999 | Escartin |
| 6,018,556 A | 1/2000 | Janesch et al. |
| 6,021,159 A | 2/2000 | Nakagawa |
| 6,028,894 A | 2/2000 | Oishi et al. |
| 6,032,026 A | 2/2000 | Seki et al. |
| 6,034,952 A | 3/2000 | Dohi et al. |
| 6,052,586 A | 4/2000 | Karabinis |
| 6,055,278 A | 4/2000 | Ho et al. |
| 6,061,393 A | 5/2000 | Tsui et al. |
| 6,084,919 A | 7/2000 | Kleider et al. |
| 6,108,374 A | 8/2000 | Balachandran et al. |
| 6,125,148 A | 9/2000 | Frodigh et al. |
| 6,128,357 A | 10/2000 | Lu et al. |
| 6,131,013 A | 10/2000 | Bergstrom et al. |
| 6,140,809 A | 10/2000 | Doi |
| 6,141,534 A | 10/2000 | Snell et al. |
| 6,144,708 A | 11/2000 | Maruyama |
| 6,166,601 A | 12/2000 | Shalom et al. |
| 6,178,158 B1 | 1/2001 | Suzuki et al. |
| 6,188,717 B1 | 2/2001 | Kaiser et al. |
| 6,212,360 B1 | 4/2001 | Fleming, III et al. |
| 6,219,095 B1 | 4/2001 | Zhang et al. |
| 6,249,180 B1 | 6/2001 | Maalej et al. |
| 6,266,534 B1 | 7/2001 | Raith et al. |
| 6,272,679 B1 | 8/2001 | Norin |
| 6,275,678 B1 | 8/2001 | Bethscheider et al. |
| 6,297,691 B1 | 10/2001 | Anderson et al. |
| 6,304,594 B1 | 10/2001 | Salinger |
| 6,307,435 B1 | 10/2001 | Nguyen et al. |
| 6,320,919 B1 | 11/2001 | Khayrallah et al. |
| 6,325,332 B1 | 12/2001 | Cellier et al. |
| 6,330,336 B1 | 12/2001 | Kasama |
| 6,366,309 B1 | 4/2002 | Siegle |
| 6,389,002 B1 | 5/2002 | Schilling |
| 6,411,659 B1 | 6/2002 | Liu et al. |
| 6,411,797 B1 | 6/2002 | Estinto |
| 6,426,822 B1 | 7/2002 | Winter et al. |
| 6,429,740 B1 | 8/2002 | Nguyen et al. |
| 6,433,835 B1 | 8/2002 | Hartson et al. |
| 6,501,804 B1 | 12/2002 | Dietmar et al. |
| 6,515,713 B1 | 2/2003 | Nam |
| 6,535,497 B1 | 3/2003 | Raith |
| 6,535,801 B1 | 3/2003 | Geier et al. |
| 6,574,235 B1 | 6/2003 | Arslan et al. |
| 6,597,750 B1 | 7/2003 | Knutson et al. |
| 6,718,184 B1 | 4/2004 | Aiken et al. |
| 6,731,700 B1 | 5/2004 | Yakhnich et al. |
| 6,745,050 B1 | 6/2004 | Forsythe et al. |
| 6,775,521 B1 | 8/2004 | Chen |
| 6,892,068 B2 | 5/2005 | Karabinis et al. |
| 6,934,314 B2 | 8/2005 | Harles et al. |
| 6,970,496 B1 * | 11/2005 | Ben-Bassat et al. ........ 375/141 |
| 2001/0024479 A1 | 9/2001 | Samarasooriya |
| 2002/0071506 A1 | 6/2002 | Lindquist et al. |
| 2002/0158619 A1 | 10/2002 | Chen |
| 2002/0176516 A1 | 11/2002 | Jeske et al. |
| 2003/0002471 A1 * | 1/2003 | Crawford et al. ........... 370/343 |
| 2003/0138037 A1 | 7/2003 | Kaku et al. |
| 2004/0110467 A1 | 6/2004 | Wang |
| 2004/0146296 A1 | 7/2004 | Gerszberg et al. |
| 2005/0008100 A1 | 1/2005 | Chen |
| 2006/0056541 A1 * | 3/2006 | Chen et al. ................. 375/316 |

FOREIGN PATENT DOCUMENTS

| | | |
|---|---|---|
| EP | 0222076 | 8/1986 |
| EP | 0238822 | 9/1987 |
| EP | 0356096 | 2/1990 |
| EP | 0929164 | 7/1999 |
| FR | 2696295 | 4/1994 |
| JP | 2-5631 | 1/1990 |
| JP | 2-95033 | 1/1990 |

| | | |
|---|---|---|
| JP | 03139027 | 6/1991 |
| JP | 5-41683 | 2/1993 |
| JP | 5-114878 | 5/1993 |
| JP | 5-252084 | 9/1993 |
| JP | 07-038615 | 2/1995 |
| WO | WO 99/20001 | 4/1999 |
| WO | WO 01/80471 | 10/2001 |
| WO | WO 02/073817 | 9/2002 |
| WO | WO 03/105375 | 12/2003 |

OTHER PUBLICATIONS

Janssen, G.J.M; Slimane, S.B,: "Performance of a Multiuser Detector for M-PSK Signals Based on Successive Cancellation", ICC 2001, 2001 IEEE International Conference on Communications, Conference Record, Helsinky, Finland, Jun. 11-14, 2001. XP010552960.

Slimane, S.B.; Janssen, G.J.M.: "Power Optimization of M-PSK Cochannel Signals for a Narrowband Multiuser Detector", 2001 IEEE Pacific Rim Conference on Communications, Computer and Signal Processing, Victoria, B.C., Canada, Aug. 26-28, 2001, XP010560334.

Soong, A.C.K.; Krzymien, W.A.: "Performance of a Reference Symbol Assisted Multistage Successive Interference Cancelling Receiver in a Multicell CDMA Wireless System", Conference Record, Communication Theory Mini-Conference GlobeCom '95, IEEE Singapore Nov. 13-17, 1995, XP01059490.

Arslan, H; Molnar, K: "Iterative-Co-channel-Interference Cancellation in Narrowband Mobile Radio Systems", Emerging Technologies Symposium: Broadband, Wireless Internet Access, 2000 IEEE April 10-11, 2000, Piscataway, New Jersey, US, XP010538900.

Mazzini, Gianluca: "Power Division Multiple Access", Universal Personal Communications, 1998, ICUPC 1998, IEEE 1998, International Conference on Florence, Italy, Oct. 5-9 1998, New York, NY, US Oct. 5, 1998, pp. 543-546, XP010314962 ISBN: 0-7803-5106-1.

Saleh, A.A.M. et al.: "Adaptive Linearization of Power Amplifiers in Digital Radio Systems", Bell System Technical Journal, American Telephone and Telegraph Co., New York, US, vol. 62, No. 4 Part 1, Apr. 1, 1983, pp. 1019-1033, XP002028354.

Ramchandran, Kannan et al.: Multiresolution Broadcast for Digital HDTV Using Joint Source/Channel Coding, IEEE, vol. 11, No. 1, Jan. 1993, pp. 6-22.

Meyr, Heinrich et al.; "Digital Communication Receivers—Synchronization, Channel Estimation, and Signal Processing"; John Wiley & Sons, Inc.; 1998; pp. 212-213 and 217-218; XP 002364874.

Meyr, Heinrich et al.; "Digital Communication Receivers—Synchronization, Channel Estimation, and Signal Processing"; John Wiley & Sons, Inc.; 1998; pp.610-612; XP 002364876.

Wolcott, Ted J. et al.; "Uplink-Noise Limited Satellite Channels"; IEEE 1995; pp. 717-721; XP-00580915.

Seskar, Ivan et al.; "Implementation Aspects for Successive Interface Cancellation in DS/CDMA Systems"; Wireless Networks; 1998; pp. 447-452.

Earth Station Technology; 1986; pp. 404-412; XP-002248387.

Chen, Ernest et al.; "DVB-S2 Backward-Compatible Modes: A Bridge Between the Present and the Future"; International Journal of Satellite Communications and Networking; vol. 22, Issue 3, pp. 341-365; published 2004 by John Wiley & Sons, Ltd.

* cited by examiner

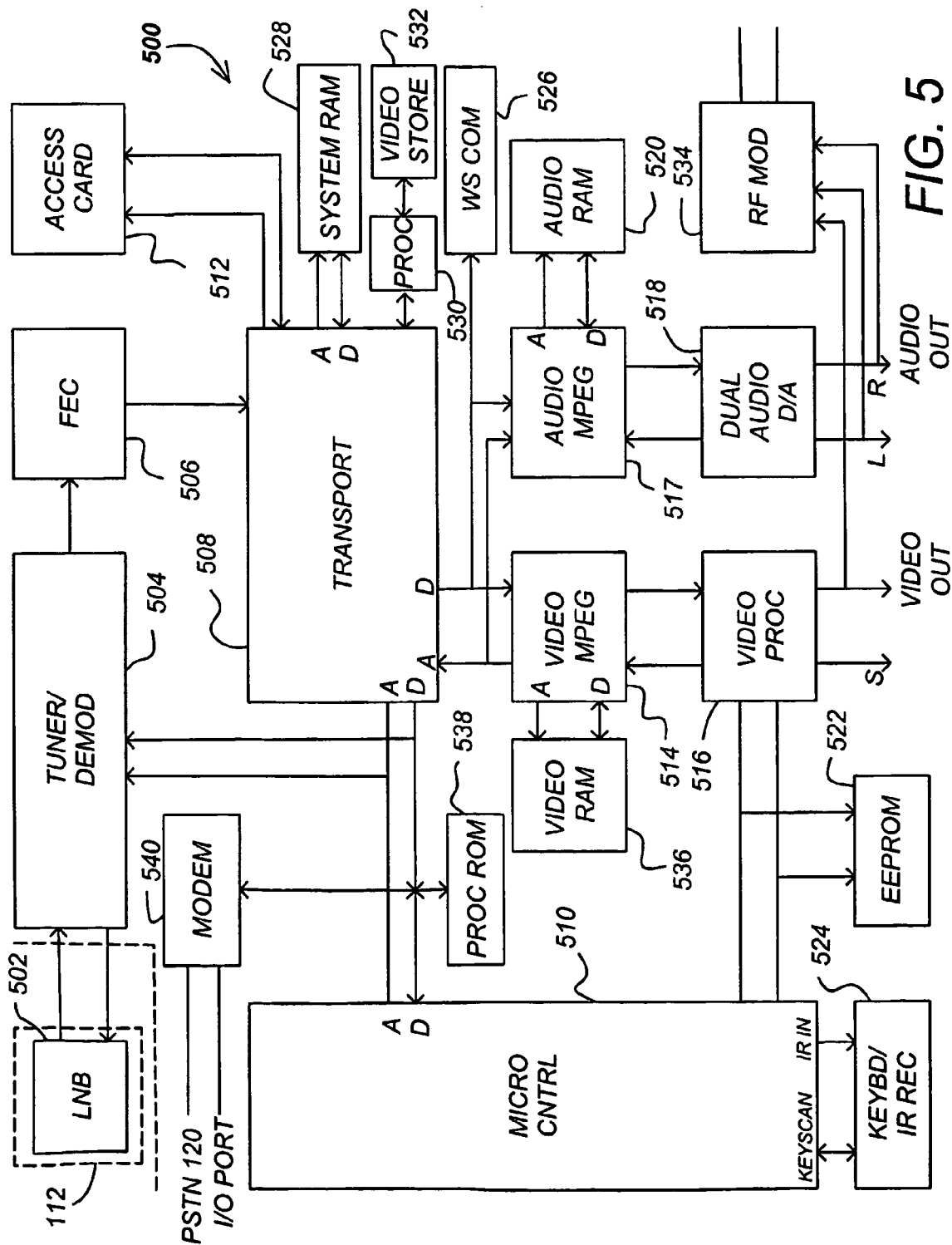

METHOD AND APPARATUS FOR TAILORING CARRIER POWER REQUIREMENTS ACCORDING TO AVAILABILITY IN LAYERED MODULATION SYSTEMS

CROSS-REFERENCE TO RELATED APPLICATIONS

This application claims benefit of U.S. Provisional Patent Application No. 60/421,333, entitled "REDUCING AVAILABILITY TO MITIGATE CARRIER POWER REQUIREMENTS IN LAYERED MODULATION," by Ernest C. Chen, Paul R. Anderson and Joseph Santoru, filed Oct. 25, 2002, which application is hereby incorporated by reference herein.

This application is also a continuation-in-part of the following co-pending and commonly assigned patent application(s), all of which applications are incorporated by reference herein:

Utility application Ser. No. 09/844,401, filed Apr. 27, 2001, by Ernest C. Chen, entitled "LAYERED MODULATION FOR DIGITAL SIGNALS," attorneys' docket number PD-200181 (109.51-US-01)

BACKGROUND OF THE INVENTION

1. Field of the Invention

The present invention relates to systems and methods for transmitting data, and in particular to a system and method for tailoring carrier power requirements in a layered modulation system.

2. Description of the Related Art

Digital signal communication systems have been used in various fields, including digital TV signal transmission, either terrestrial or satellite. As the various digital signal communication systems and services evolve, there is a burgeoning demand for increased data throughput and added services. However, it is more difficult to implement either improvement in old systems and new services when it is necessary to replace existing legacy hardware, such as transmitters and receivers. New systems and services are advantaged when they can utilize existing legacy hardware. In the realm of wireless communications, this principle is further highlighted by the limited availability of electromagnetic spectrum. Thus, it is not possible (or at least not practical) to merely transmit enhanced or additional data at a new frequency.

The conventional method of increasing spectral capacity is to move to a higher-order modulation, such as from quadrature phase shift keying (QPSK) to eight phase shift keying (8PSK) or sixteen quadrature amplitude modulation (16QAM). Unfortunately, QPSK receivers cannot demodulate conventional 8PSK or 16QAM signals. As a result, legacy customers with QPSK receivers must upgrade their receivers in order to continue to receive any signals transmitted with an 8PSK or 16QAM modulation.

It is advantageous for systems and methods of transmitting signals to accommodate enhanced and increased data throughput without requiring additional spectrum. In addition, it is advantageous for enhanced and increased throughput signals for new receivers to be backwards compatible with legacy receivers. There is further an advantage for systems and methods which allow transmission signals to be upgraded from a source separate from the legacy transmitter.

It has been proposed that a layered modulation signal, transmitting non-coherently both upper and lower layer signals, can be employed to meet these needs. Such layered modulation systems allow higher information throughput with backwards compatibility. However, even when backward compatibility is not required (such as with an entirely new system), layered modulation can still be advantageous because it requires a TWTA peak power significantly lower than that for a conventional 8PSK or 16QAM modulation format for a given throughput.

However, a significant roadblock associated with implementing layered modulation is the requirement for satellite transponder powers levels that are significantly higher than those currently deployed for given Earth coverage area.

Accordingly, there is a need for systems and methods for implementing layered modulation systems at lower transponder power levels. The present invention meets this need and provides further advantages as detailed hereafter.

SUMMARY OF THE INVENTION

To address the requirements described above, the present invention discloses a method and apparatus transmitting a layered modulation signal having a first signal layer having first signal symbols and a second signal layer having second signal symbols. The method comprises the steps of determining a first signal layer modulation carrier power $C_L$ at least in part according to a first signal layer clear sky margin $M_L$ and a first signal layer availability, determining an second signal layer modulation carrier power $C_U$ at least in part according to an second signal layer clear sky margin $M_U$ and an second signal layer availability, modulating the first signal symbols according to a first carrier at the determined first signal layer modulation carrier power; modulating the second signal symbols according to a second carrier at the determined second signal layer modulation carrier power to generate the layered modulation signal, and transmitting the layered modulation signal. In one embodiment, the second signal layer clear sky margin is less than the first signal layer clear sky margin when the first signal layer availability and the second signal layer availability are substantially equal. In another embodiment, the second signal layer availability is greater than the first signal layer availability and the second signal layer clear sky margin $M_U$ equals $$\frac{\frac{\beta_U}{\alpha_U}\beta_U + \beta_L T_L}{\alpha_L + \beta_L T_L},$$

wherein $\alpha_U$ at least partially represents the rain attenuation of the second modulation carrier, $\alpha_L$ at least partially represents the rain attenuation of the first layer modulation carrier, $\beta_U$ at least partially represents the additional noise in the second modulation carrier due to rain, and $\beta_L$ at least partially represents the additional noise in the first modulation carrier due to rain.

BRIEF DESCRIPTION OF THE DRAWINGS

Referring now to the drawings in which like reference numbers represent corresponding parts throughout:

FIG. 5 is a block diagram of an integrated receiver/decoder;

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Video Distribution System

Figure 1:
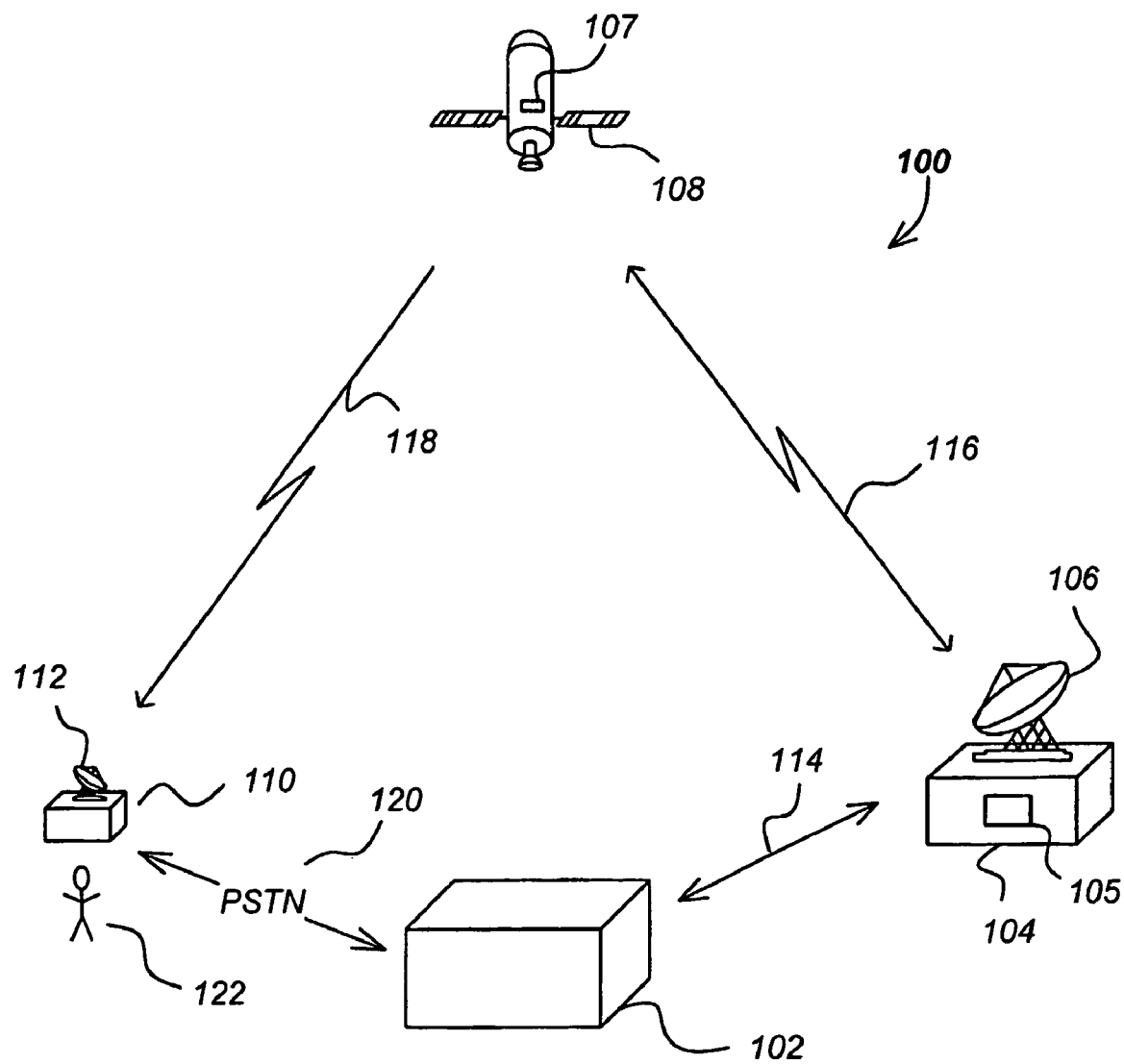
FIG. 1 is a diagram illustrating an overview of a single satellite video distribution system.

FIG. 1 is a diagram illustrating an overview of a single satellite video distribution system 100. The video distribution system 100 comprises a control center 102 in communication with an uplink center 104 via a ground or other link 114 and with a subscriber receiver station 10 via a public switched telephone network (PSTN) or other link 120. The control center 102 provides program material (e.g. video programs, audio programs and data) to the uplink center 104 and coordinates with the subscriber receiver stations 110 to offer, for example, pay-per-view (PPV) program services, including billing and associated decryption of video programs.

The uplink center 104 receives program material and program control information from the control center 102, and using an uplink antenna 106 and transmitter 105, transmits the program material and program control information to the satellite 108. The satellite receives and processes this information, and transmits the video programs and control information to the subscriber receiver station 110 via downlink 118 using transmitter 107. The subscriber receiving station 110 receives this information using the outdoor unit (ODU) 112, which includes a subscriber antenna and a low noise block converter (LNB).

In one embodiment, the subscriber receiving station antenna is an 18-inch slightly oval-shaped Ku-band antenna. The slight oval shape is due to the 22.5 degree offset feed of the LNB (low noise block converter) which is used to receive signals reflected from the subscriber antenna. The offset feed positions the LNB out of the way so it does not block any surface area of the antenna minimizing attenuation of the incoming microwave signal.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscriber receiving stations 110. Using data compression and multiplexing techniques the channel capabilities, two satellites 108 working together can receive and broadcast over 150 conventional (non-HDTV) audio and video channels via 32 transponders.

While the invention disclosed herein will be described with reference to a satellite-based video distribution system 100, the present invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber 122 is video (and audio) program material such as a movie, the foregoing method can be used to deliver program material comprising purely audio information or other data as well.

Uplink Configuration

Figure 2:
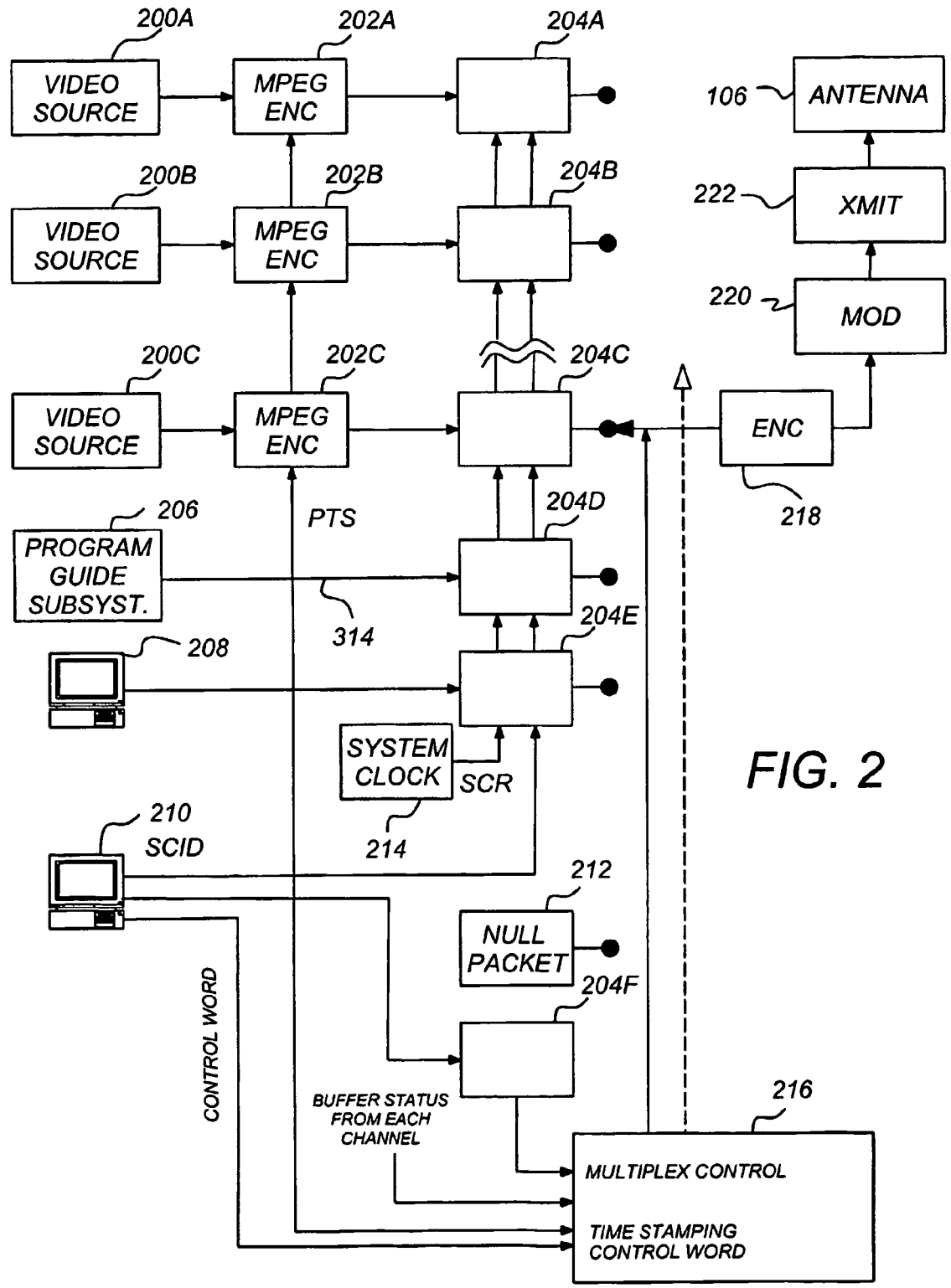
FIG. 2 is a block diagram showing a typical uplink configuration for a single satellite transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), a data channel from a program guide subsystem 206 and computer data information from a computer data source 208.

The video channels are provided by a program source of video material 200A–200C (collectively referred to hereinafter as video source(s) 200). The data from each video program source 200 is provided to an encoder 202A–202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A–204F (collectively referred to hereinafter as packetizer(s) 204) associated with each source 200.

The data packets are assembled using a reference from the system clock 214 (SCR), and from the conditional access manager 210, which provides the SCD to the packetizers 204 for use in generating the data packets. These data packets are then multiplexed into serial data and transmitted.

Broadcast Data Stream Format and Protocol

Figure 3A:
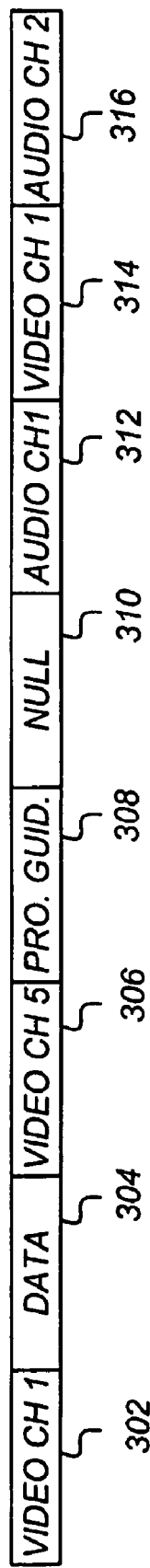
FIG. 3A is a diagram of a representative data stream.

FIG. 3A is a diagram of a representative data stream. The first packet segment 302 comprises information from video channel 1 (data coming from, for example, the first video program source 200A). The next packet segment 304 comprises computer data information that was obtained, for example from the computer data source 208. The next packet segment 306 comprises information from video channel 5 (from one of the video program sources 200). The next packet segment 308 comprises program guide information such as the information provided by the program guide subsystem 206. As shown in FIG. 3A, null packets 310 created by the null packet module 310 may be inserted into the data stream as desired.

The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106. The receiver 500 receives these signals, and using the SCID, reassembles the packets to regenerate the program material for each of the channels.

Figure 3B:
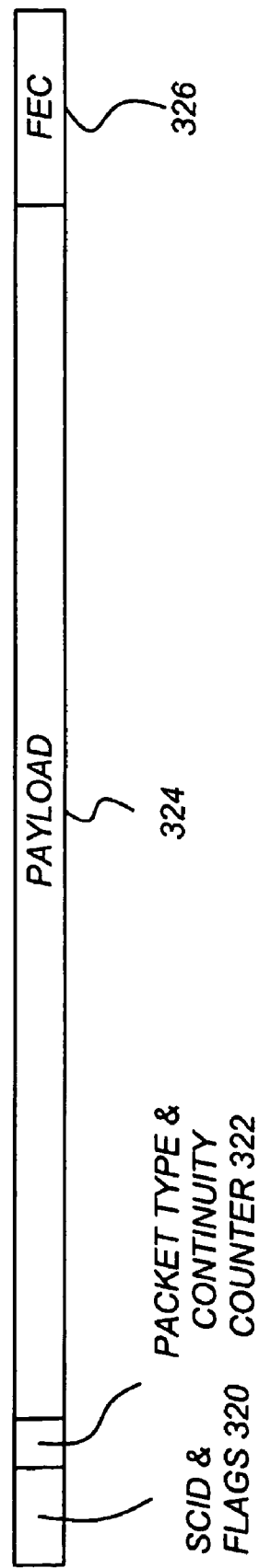
FIG. 3B is a diagram of a representative data packet.

FIG. 3B is a diagram of a data packet. Each data packet (e.g. 302–316) is 130 bytes long, and comprises a number of packet segments. The first packet segment 320 comprises two bytes of information containing the SCID and flags. The SCID is a unique 12-bit number that uniquely identifies the data packet's data channel. The flags include 4 bits that are used to control other features. The second packet segment 322 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 324 comprises 127 bytes of payload data, which in the cases of packets 302 or 306 is a portion of the video program provided by the video program source 200. The final packet segment 326 is data required to perform forward error correction.

Figure 4:
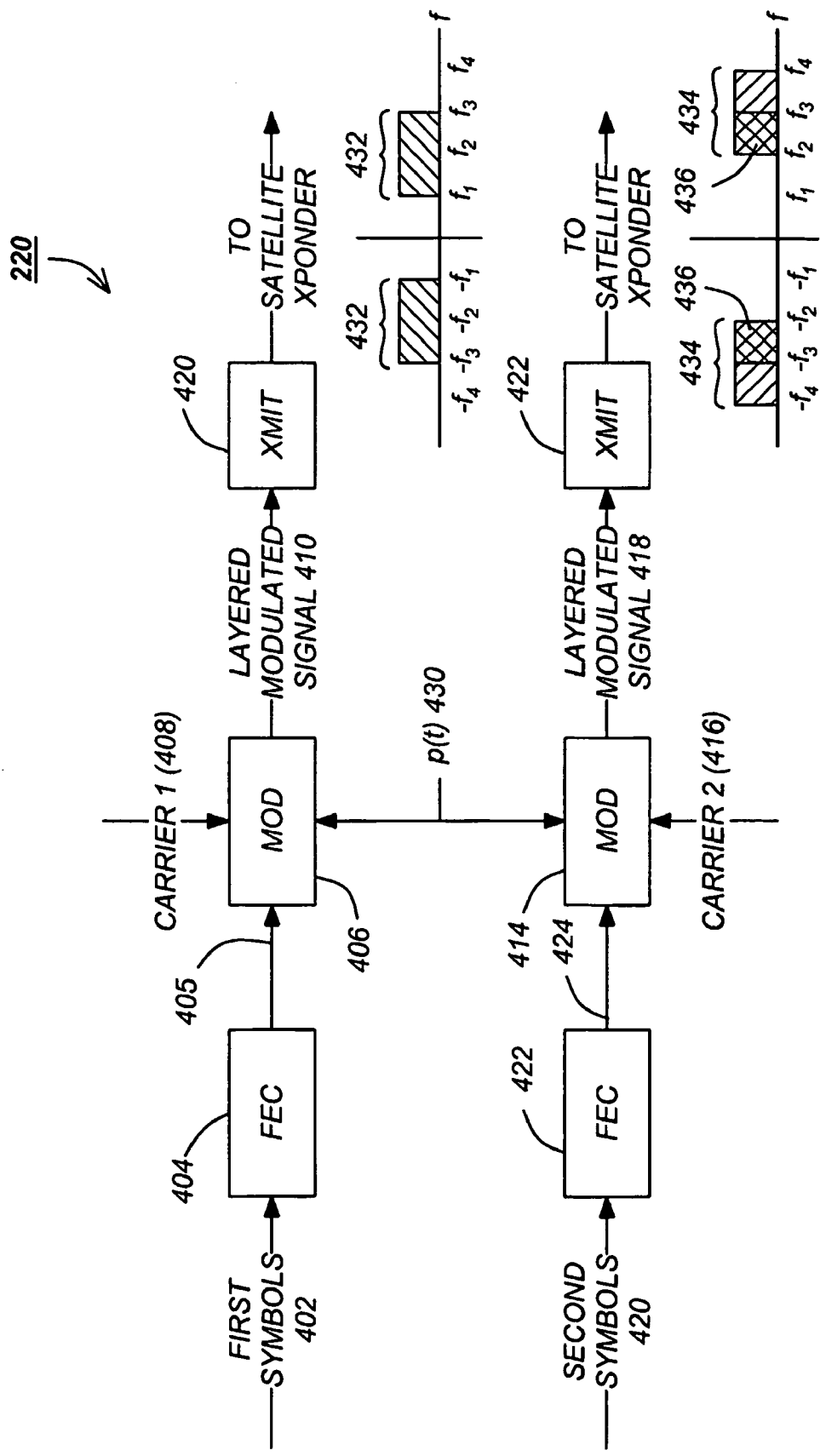
FIG. 4 is a block diagram showing one embodiment of the modulator.

FIG. 4 is a block diagram showing one embodiment of the modulator 220. The modulator 220 optionally comprises a forward error correction (FEC) encoder 404 which accepts the first signal symbols 402 and adds redundant information that are used to reduce transmission errors. The coded symbols 405 are modulated by modulator 406 according to a first carrier 408 to produce an upper layer modulated signal 410. Second symbols 420 are likewise provided to an optional second FEC encoder 422 to produce coded second symbols 422. The coded second symbols 422 are provided to a second modulator 414, which modulates the coded second signals according to a second carrier 416 to produce a lower layer modulated signal 418. The resulting signals are then transmitted by one or more transmitters 420, 422. The upper layer modulated signal 410 and the lower layer modulated signal 418 are therefore uncorrelated, and the frequency range used to transmit each layer can substantially or completely overlap the frequency spectrum used to transmit the other. For example, as shown in FIG. 4, the frequency spectrum $f_1 \rightarrow f_3$ 432 of the upper layer signal 410 may overlap the frequency spectrum $f_2 \rightarrow f_4$ 434 of the lower layer signal 418 in frequency band $f_2$-$f_3$ 436. The upper layer signal 410, however, must be a sufficiently greater amplitude signal than the lower layer signal 418, in order to maintain the signal constellations shown in FIG. 6 and FIG. 7. The modulator 220 may also employ pulse shaping techniques (illustrated by pulse p(t) 430) to account for the limited channel bandwidth. Although FIG. 4 illustrates the same pulse shaping p(t) 430 being applied to both layers, different pulse shaping can be applied to each layer as well.

Integrated Receiver/Decoder

FIG. 5 is a block diagram of an integrated receiver/decoder (IRD) 500 (also hereinafter alternatively referred to as receiver 500). The receiver 500 comprises a tuner/demodulator 504 communicatively coupled to an ODU 112 having one or more LNBs 502. The LNB 502 converts the 12.2- to 12.7 GHz downlink 118 signal from the satellites 108 to, e.g., a 950–1450 MHz signal required by the IRD's 500 tuner/demodulator 504. The LNB 502 may provide either a dual or a single output. The single-output LNB 502 has only one RF connector, while the dual output LNB 502 has two RF output connectors and can be used to feed a second tuner 504, a second receiver 500, or some other form of distribution system.

The tuner/demodulator 504 isolates a single, digitally modulated 24 MHz transponder, and converts the modulated data to a digital data stream. Further details regarding the demodulation of the received signal follow.

The digital data stream is then supplied to a forward error correction (FEC) decoder 506. This allows the IRD 500 to reassemble the data transmitted by the uplink center 104 (which applied the forward error correction to the desired signal before transmission to the subscriber receiving station 110) verifying that the correct data signal was received, and correcting errors, if any. The error-corrected data may be fed from the FEC decoder module 506 to the transport module 508 via an 8-bit parallel interface.

The transport module 508 performs many of the data processing functions performed by the IRD 500. The transport module 508 processes data received from the FEC decoder module 506 and provides the processed data to the video MPEG decoder 514 and the audio MPEG decoder 517. In one embodiment of the present invention, the transport module, video MPEG decoder and audio MPEG decoder are all implemented on integrated circuits. This design promotes both space and power efficiency, and increases the security of the functions performed within the transport module 508. The transport module 508 also provides a passage for communications between the microcontroller 510 and the video and audio MPEG decoders 514, 517. As set forth more fully hereinafter, the transport module also works with the conditional access module (CAM) 512 to determine whether the subscriber receiving station 110 is permitted to access certain program material. Data from the transport module can also be supplied to external communication module 526.

The CAM 512 functions in association with other elements to decode an encrypted signal from the transport module 508. The CAM 512 may also be used for tracking and billing these services. In one embodiment of the present invention, the CAM 512 is a smart card, having contacts cooperatively interacting with contacts in the IRD 500 to pass information. In order to implement the processing performed in the CAM 512, the IRD 500, and specifically the transport module 508 provides a clock signal to the CAM 512.

Video data is processed by the MPEG video decoder 514. Using the video random access memory (RAM) 536, the MPEG video decoder 514 decodes the compressed video data and sends it to an encoder or video processor 516, which converts the digital video information received from the video MPEG module 514 into an output signal usable by a display or other output device. By way of example, processor 516 may comprise a National TV Standards Committee (NTSC) or Advanced Television Systems Committee (ATSC) encoder. In one embodiment of the invention both S-Video and ordinary video (NTSC or ATSC) signals are provided. Other outputs may also be utilized, and are advantageous if high definition programming is processed.

Audio data is likewise decoded by the MPEG audio decoder 517. The decoded audio data may then be sent to a digital to analog (D/A) converter 518. In one embodiment of the present invention, the D/A converter 518 is a dual D/A converter, one for the right and left channels. If desired, additional channels can be added for use in surround sound processing or secondary audio programs (SAPs). In one embodiment of the invention, the dual D/A converter 518 itself separates the left and right channel information, as well as any additional channel information. Other audio formats may similarly be supported. For example, other audio formats such as multi-channel DOLBY DIGITAL AC-3 may be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microcontroller 510 receives and processes command signals from the remote control 524, an IRD 500 keyboard interface, and/or another input device. The microcontroller receives commands for performing its operations from a processor programming memory, which permanently stores such instructions for performing such commands. The processor programming memory may comprise a read only memory (ROM) 538, an electrically erasable programmable read only memory (EEPROM) 522 or, similar memory device. The microcontroller 510 also controls the other digital devices of the IRD 500 via address and data lines (denoted "A" and "D" respectively, in FIG. 5).

The modem 540 connects to the customer's phone line via the PSTN port 120. It calls, e.g. the program provider, and transmits the customer's purchase information for billing purposes, and/or other information. The modem 540 is controlled by the microprocessor 510. The modem 540 can output data to other I/O port types including standard parallel and serial computer I/O ports.

The present invention also comprises a local storage unit such as the video storage device 532 for storing video and/or audio data obtained from the transport module 508. Video storage device 532 can be a hard disk drive, a read/writable compact disc of DVD, a solid state RAM, or any other storage medium. In one embodiment of the present invention, the video storage device 532 is a hard disk drive with specialized parallel read/write capability so that data may be read from the video storage device 532 and written to the device 532 at the same time. To accomplish this feat, additional buffer memory accessible by the video storage 532 or its controller may be used. Optionally, a video storage processor 530 can be used to manage the storage and retrieval of the video data from the video storage device 532. The video storage processor 530 may also comprise memory for buffering data passing into and out of the video storage device 532. Alternatively or in combination with the foregoing, a plurality of video storage devices 532 can be used. Also alternatively or in combination with the foregoing, the microcontroller 510 can also perform the operations required to store and or retrieve video and other data in the video storage device 532.

The video processing module 516 input can be directly supplied as a video output to a viewing device such as a video or computer monitor. In addition, the video and/or audio outputs can be supplied to an RF modulator 534 to produce an RF output and/or 8 vestigial side band (VSB) suitable as an input signal to a digital terrestrial television tuner. This allows the receiver 500 to operate with televisions without a video output.

Each of the satellites 108 comprises a transponder, which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective service channel identification (SCID).

Preferably, the IRD 500 also receives and stores a program guide in a memory available to the microcontroller 510. Typically, the program guide is received in one or more data packets in the data stream from the satellite 108. The program guide can be accessed and searched by the execution of suitable operation steps implemented by the microcontroller 510 and stored in the processor ROM 538. The program guide may include data to map viewer channel numbers to satellite transponders and service channel identifications (SCIDs), and also provide TV program listing information to the subscriber 122 identifying program events.

The functionality implemented in the IRD 500 depicted in FIG. 5 can be implemented by one or more hardware modules, one or more software modules defining instructions performed by a processor, or a combination of both.

The present invention provides for the modulation of signals at different power levels and advantageously for the signals to be non-coherent from each layer. In addition, independent modulation and coding of the signals may be performed. Backwards compatibility with legacy receivers, such as a quadrature phase shift keying (QPSK) receiver is enabled and new services are provided to new receivers. A typical new receiver of the present invention uses two demodulators and one remodulator as will be described in detail hereafter.

In a typical backwards-compatible embodiment of the present invention, the legacy QPSK signal is boosted in power to a higher transmission (and reception) level. The legacy receiver will not be able to distinguish the new lower layer signal from additive white Gaussian noise and thus operates in the usual manner. The optimum selection of the layer power levels is based on accommodating the legacy equipment, as well as the desired new throughput and services.

The combined layered signal is demodulated and decoded by first demodulating the upper layer to remove the upper carrier. The stabilized layered signal may then have the upper layer FEC decoded and the output upper layer symbols communicated to the upper layer transport. The upper layer symbols are also employed in a remodulator, to generate an idealized upper layer signal. The idealized upper layer signal is then subtracted from the stable layered signal to reveal the lower layer signal. The lower layer signal is then demodulated and FEC decoded and communicated to the lower layer transport.

The new lower layer signal is provided with a sufficient carrier to thermal noise ratio to function properly. The new lower layer signal and the boosted legacy signal are non-coherent with respect to each other. Therefore, the new lower layer signal can be implemented from a different TWTA and even from a different satellite. The new lower layer signal format is also independent of the legacy format, e.g., it may be QPSK or 8PSK, using the conventional concatenated FEC code or using a new Turbo code. The lower layer signal may even be an analog signal.

Signals, systems and methods using the present invention may be used to supplement a pre-existing transmission compatible with legacy receiving hardware in a backwards-compatible application or as part of a preplanned layered modulation architecture providing one or more additional layers at a present or at a later date.

Layered Signals

Figure 6B:
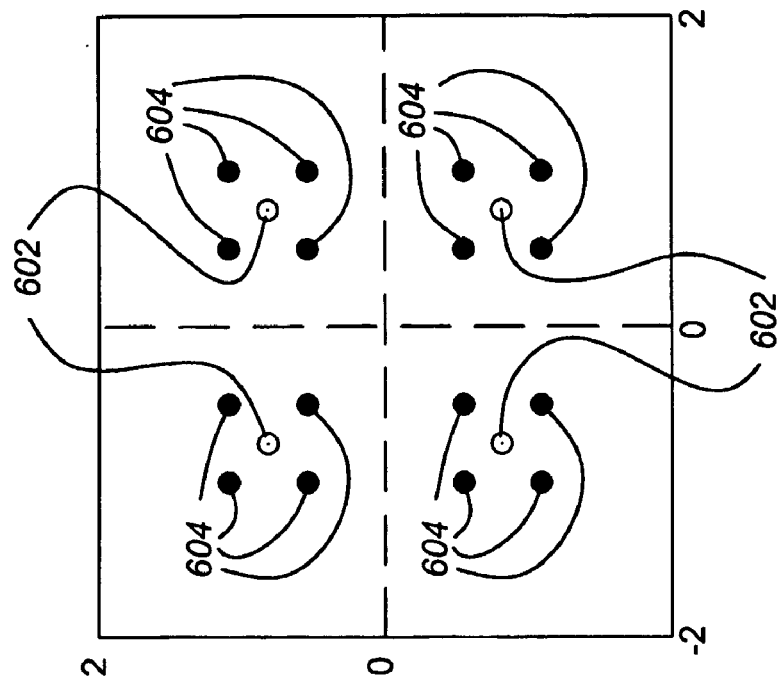
FIGS. 6A–6C are diagrams illustrating the basic relationship of signal layers in a layered modulation transmission.
Figure 6A:
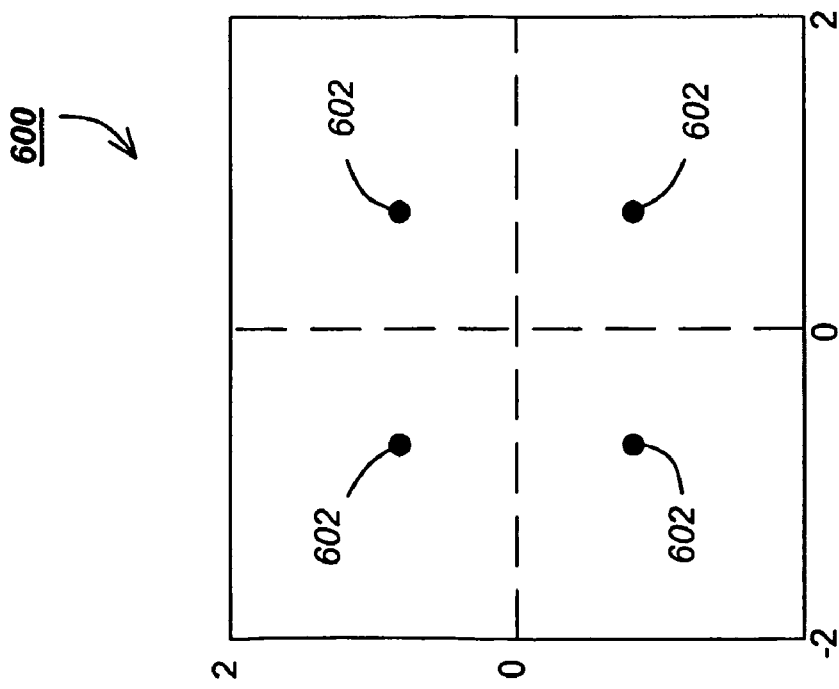
Figure 6C:
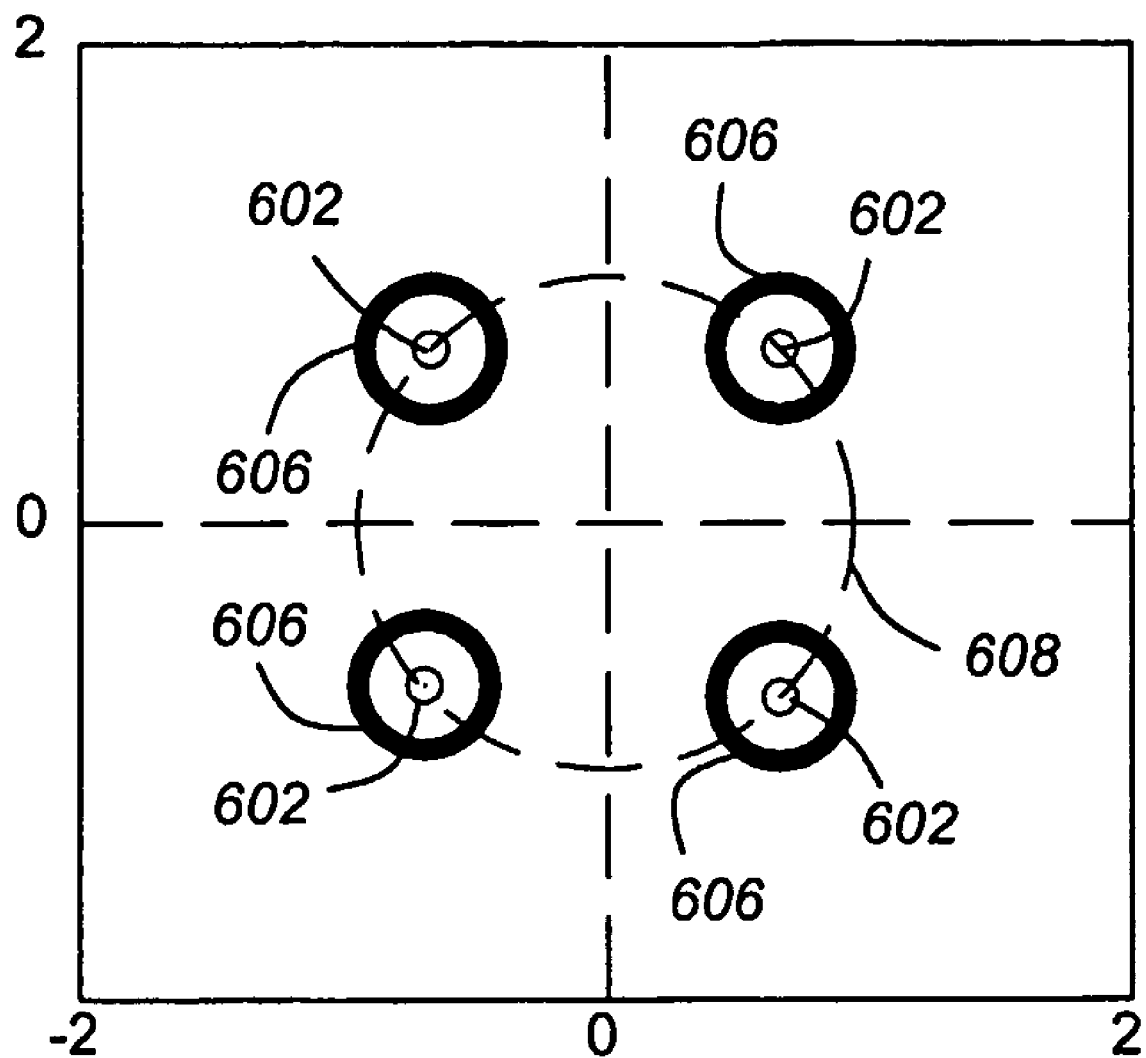

FIGS. 6A–6C illustrate the basic relationship of signal layers in a layered modulation transmission. In these figures the horizontal axis is for the in-phase, or "I" value of the displayed symbol, and the vertical axis for the quadratue, or "Q" value of the displayed symbol. FIG. 6A illustrates a first layer signal constellation 600 of a transmission signal showing the signal points or symbols 602. This signal constellation is FIG. 6B illustrates the second layer signal constellation of symbols 604 over the first layer signal constellation 600 where the layers are coherent. FIG. 2C illustrates a second signal layer 606 of a second transmission layer over the first layer constellation where the layers may be non-coherent. The second layer 606 rotates about the first layer constellation 602 due to the relative modulating frequencies of the two layers in a non-coherent transmission. Both the first and second layers rotate about the origin due to the first layer modulation frequency as described by path 608.

Figure 7B:
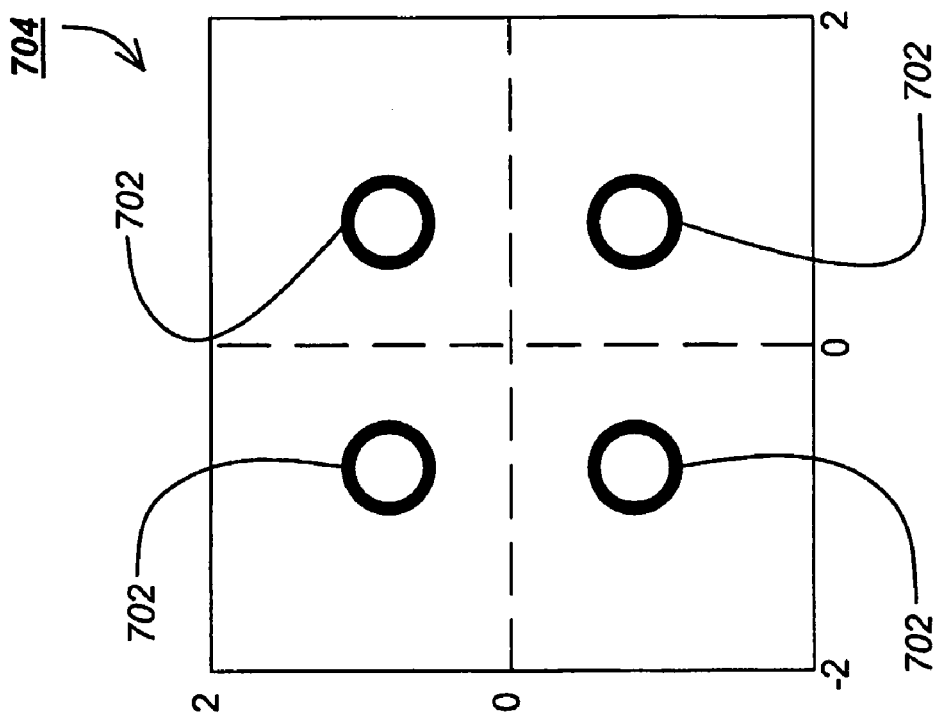
FIGS. 7A–7C are diagrams illustrating a signal constellation of a second transmission layer over the first transmission layer after first layer demodulation.
Figure 7A:
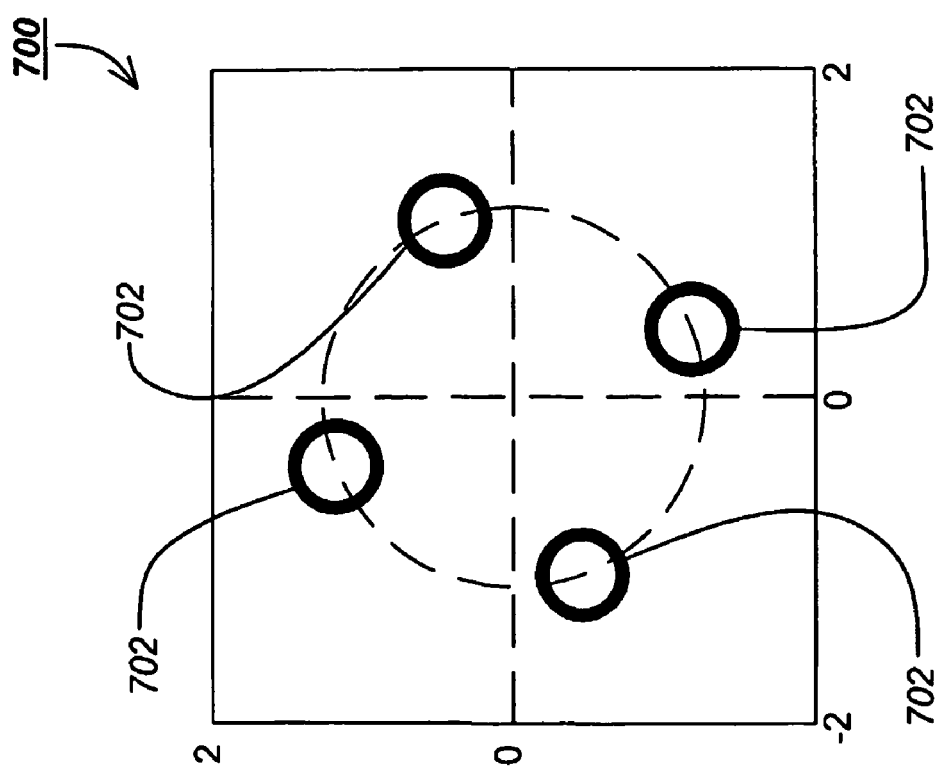
Figure 7C:
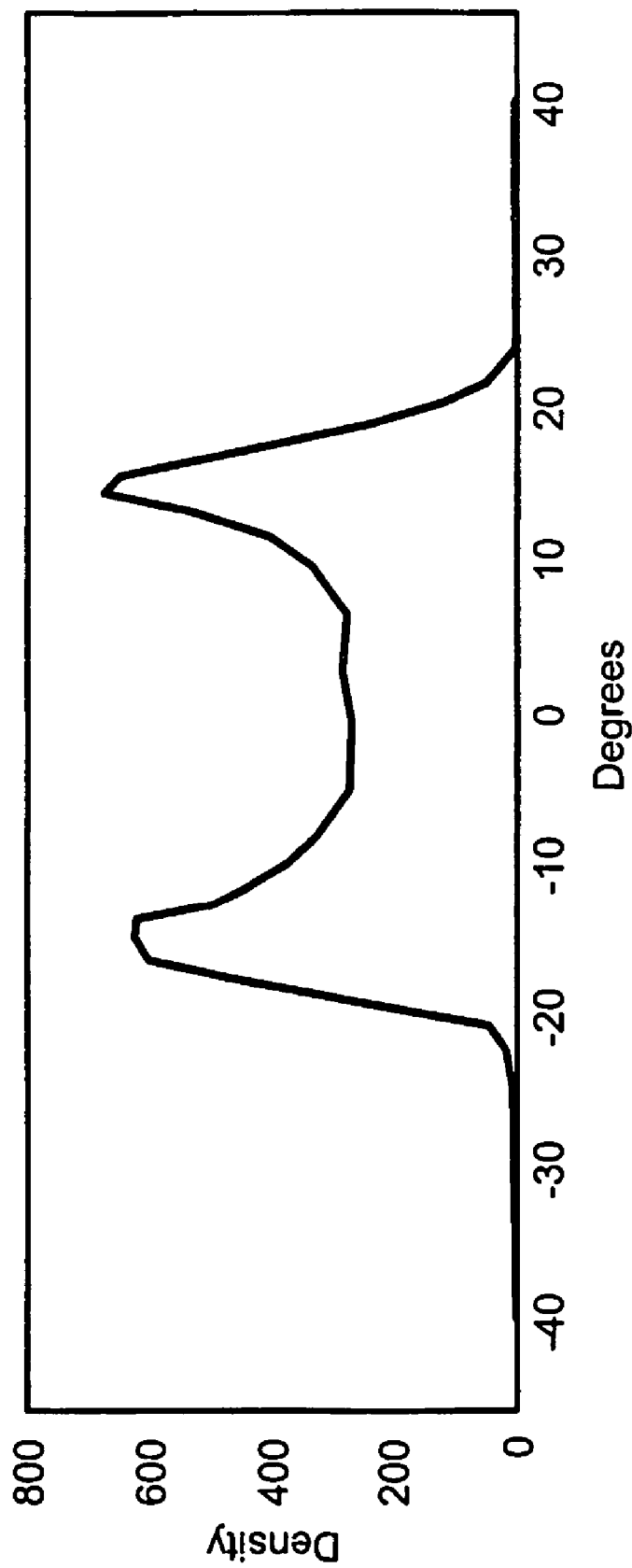

FIGS. 7A–7C are diagrams illustrating a signal constellation of a second transmission layer over the first transmission layer after first layer demodulation. FIG. 7A shows the constellation 700 before the first carrier recovery loop (CRL) and FIG. 7B shows the constellation 704 after CRL. In this case, the signal points of the second layer are actually rings 702. FIG. 7C depicts a phase distribution of the received signal with respect to nodes 602.

Relative modulating frequencies cause the second layer constellation to rotate around the nodes of the first layer constellation. After the second layer CRL this rotation is eliminated. The radius of the second layer constellation is determined by its power level. The thickness of the rings 702 is determined by the carrier to noise ratio (CNR) of the second layer. As the two layers are non-coherent, the second layer may also be used to transmit analog or digital signals.

Figure 8:
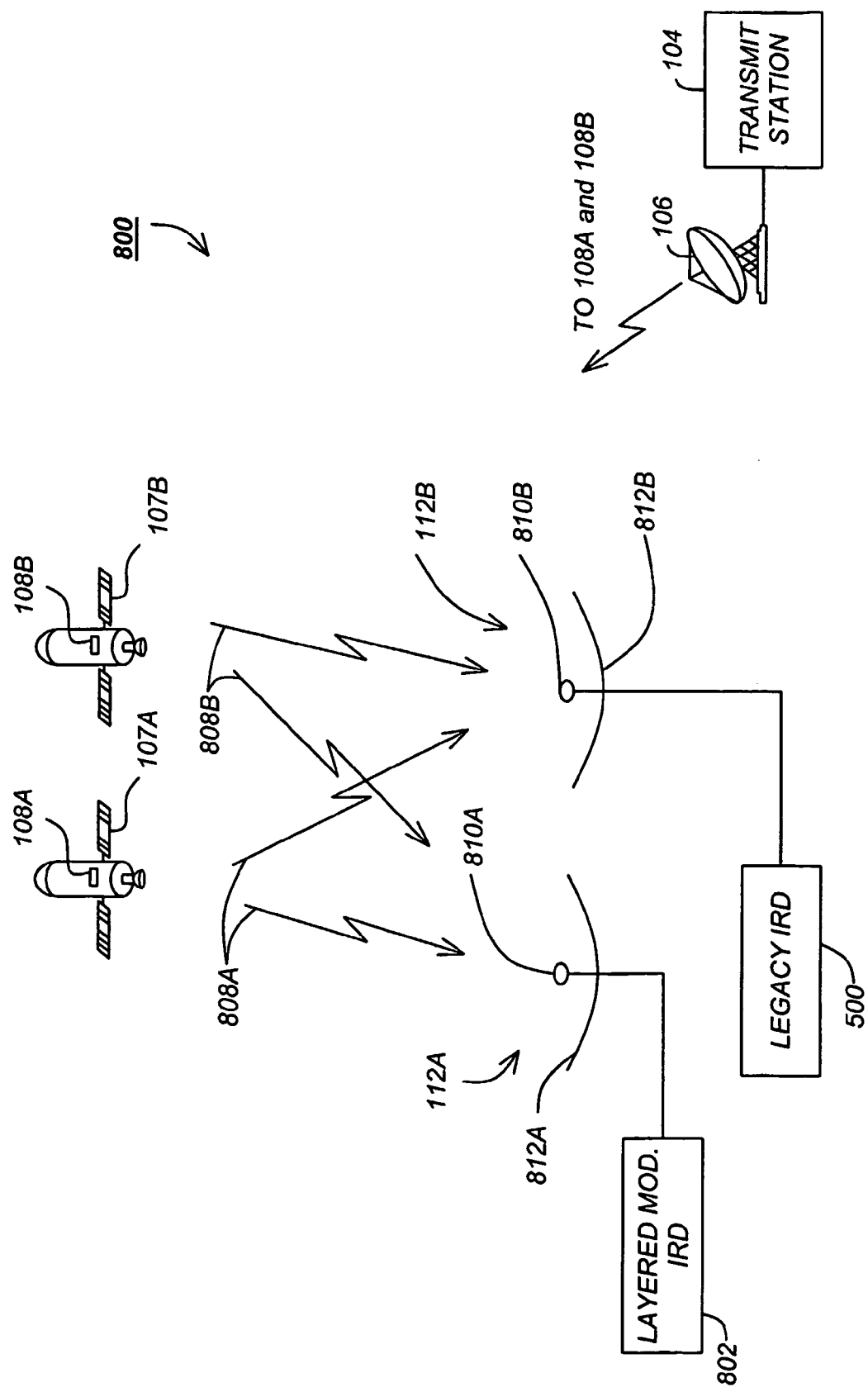
FIG. 8 is a diagram showing a system for transmitting and receiving layered modulation signals.

FIG. 8 is a diagram showing a system for transmitting and receiving layered modulation signals. Separate transmitters 107A, 107B, as may be located on any suitable platform, such as satellites 108A, 108B, are used to non-coherently transmit different layers of a signal of the present invention. Uplink signals are typically transmitted to each satellite 108A, 108B from one or more transmitters 105 via an antenna 106. The layered signals 808A, 808B (downlink signals) are received at receiver antennas 112A, 112B, such as satellite dishes, each with a low noise block (LNB) 810A, 810B where they are then coupled to integrated receiver/decoders (IRDs) 500, 802. Because the signal layers may be transmitted non-coherently, separate transmission layers may be added at any time using different satellites 108A, 108B or other suitable platforms, such as ground based or high altitude platforms. Thus, any composite signal, including new additional signal layers will be backwards compatible with legacy receivers 500, which will disregard the new signal layers. To ensure that the signals do not interfere, the combined signal and noise level for the lower layer must be at or below the allowed noise floor for the upper layer.

Layered modulation applications include backwards compatible and non-backwards compatible applications. "Backwards compatible" in this sense, describes systems in which legacy receivers 500 are not rendered obsolete by the additional signal layer(s). Instead, even if the legacy receivers 500 are incapable of decoding the additional signal layer(s), they are capable of receiving the layered modulated signal and decoding the original signal layer. In these applications, the pre-existing system architecture is accommodated by the architecture of the additional signal layers. "Non-backwards compatible" describes a system architecture which makes use of layered modulation, but the modulation and coding scheme employed is such that pre-existing equipment is incapable of receiving and decoding the information on additional signal layer(s).

The pre-existing legacy IRDs 500 decode and make use of data only from the layer (or layers) they were designed to receive, unaffected by the additional layers. The present invention may be applied to existing direct satellite services which are broadcast to individual users in order to enable additional features and services with new receivers without adversely affecting legacy receivers and without requiring additional signal frequencies.

Demodulator and Decoder

Figure 9:
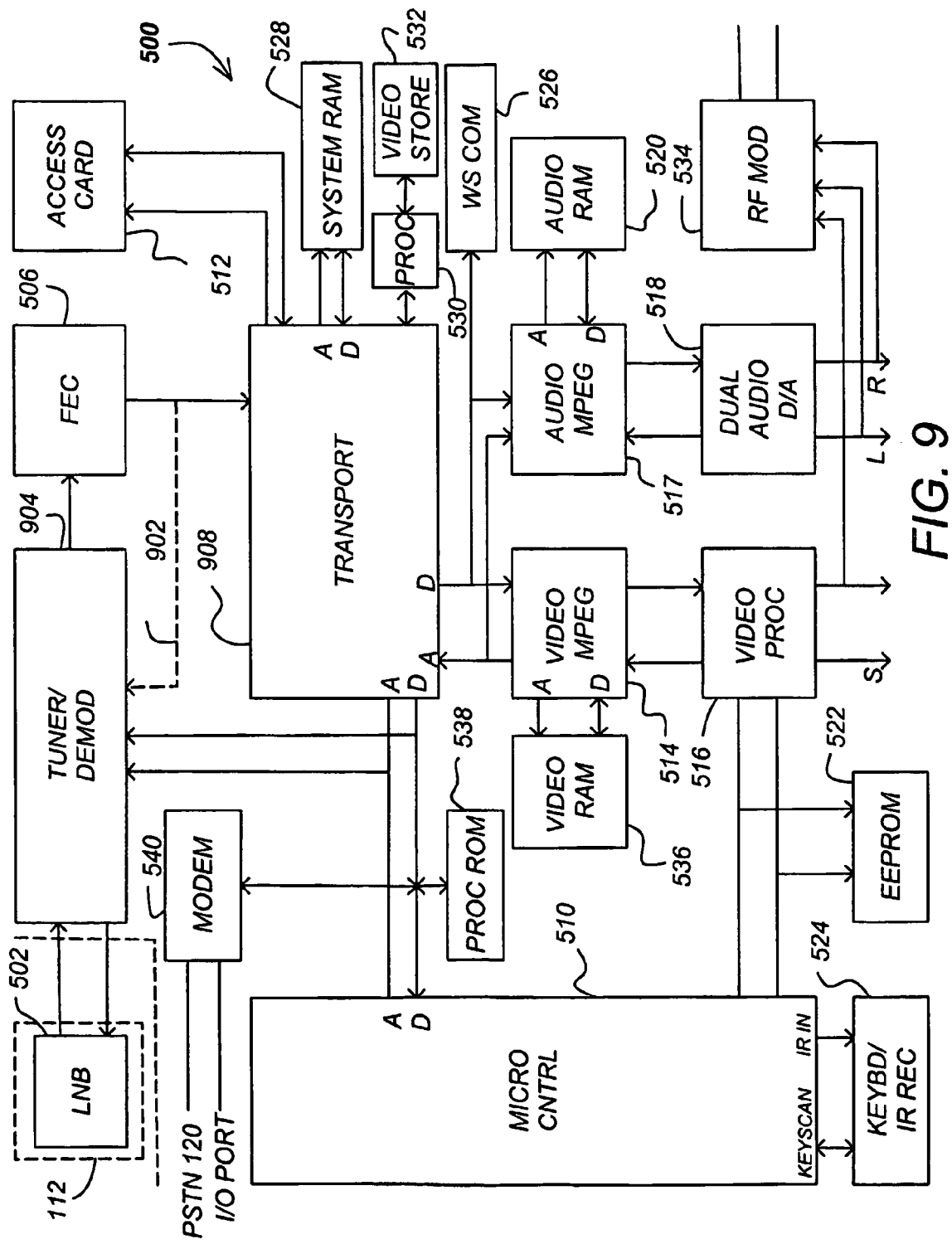
FIG. 9 is a block diagram depicting one embodiment of an enhanced receiver/decoder capable of receiving layered modulation signals.

FIG. 9 is a block diagram depicting one embodiment of an enhanced IRD 802 capable of receiving layered modulation signals. The enhanced IRD 802 includes a feedback path 902 in which the FEC decoded symbols are fed back to a enhanced modified tuner/demodulator 904 and transport module 908.

Figure 10A:
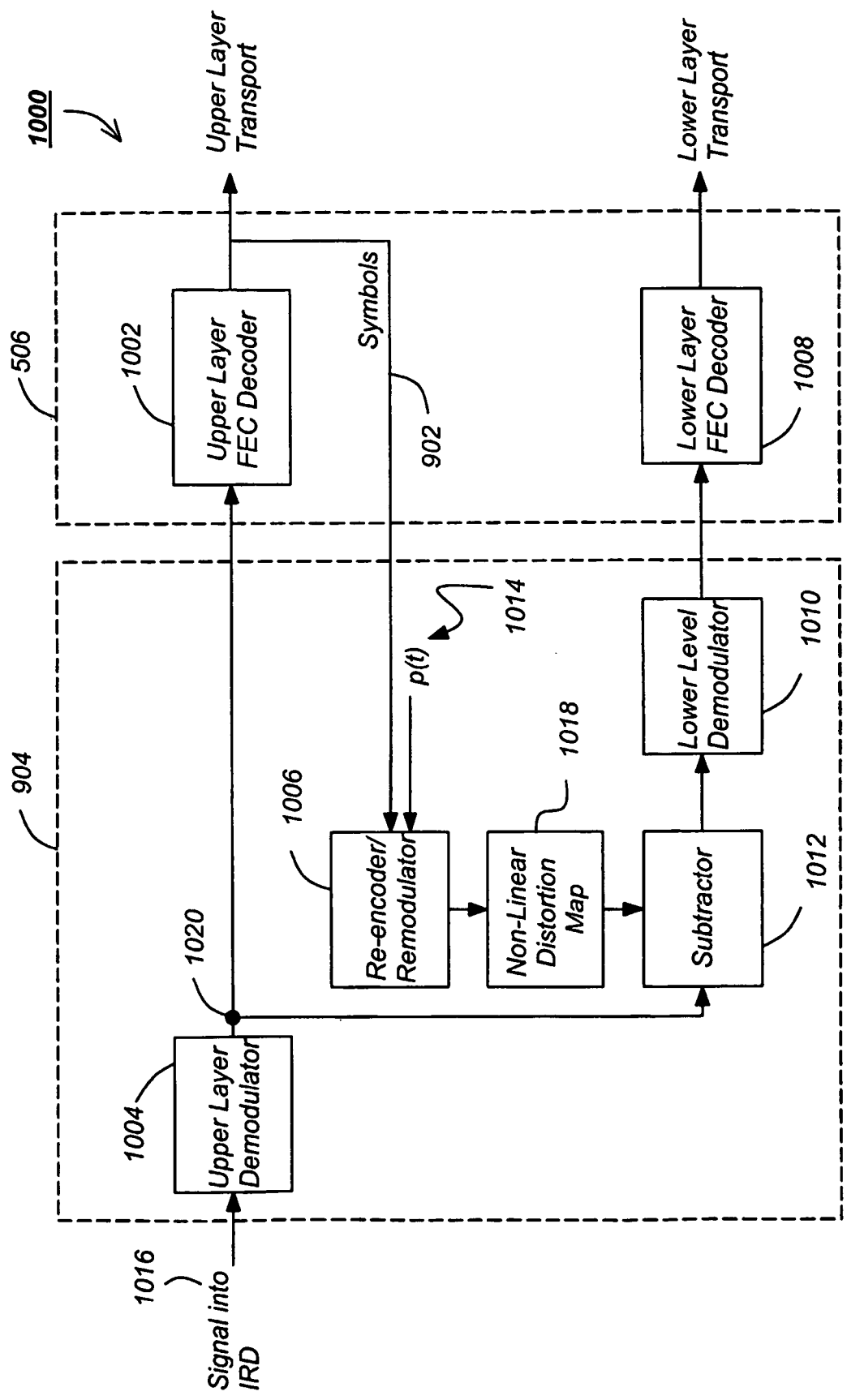
FIG. 10A is a block diagram of one embodiment of the enhanced tuner/modulator and FEC encoder.

FIG. 10A is a block diagram of one embodiment of the enhanced tuner/modulator 904 and FEC encoder 506. FIG. 10A depicts reception where layer subtraction is performed on a signal where the upper carrier has been demodulated. The upper layer of the received combined signal 1016 from the LNB 502, which may contain legacy modulation format, is provided to and processed by an upper layer demodulator 1004 to produce the stable demodulated signal 1020. The demodulated signal 1020 is fed to a communicatively coupled FEC decoder 1002 which decodes the upper layer to produce the upper layer symbols which are output to an upper layer transport. The upper layer symbols are also used to generate an idealized upper layer signal. The upper layer symbols may be produced from the decoder 1002 after Viterbi decode (BER<$10^{-3}$ or so) or after Reed-Solomon (RS) decode (BER<$10^{-9}$ or so), in typical decoding operations known to those skilled in the art. The upper layer symbols are provided via feedback path 902 from the upper layer decoder 1002 to a remodulator 1006 and then a module which applies the distortion that would be introduced by the satellite downlink network. This effectively produces an idealized upper layer signal. The idealized upper level signal is subtracted from the demodulated upper layer signal 1020.

In order for the subtraction to leave a clean lower layer signal, the upper layer signal must be precisely reproduced. The modulated signal may have been distorted, for example, by traveling wave tube amplifier (TWTA) non-linearity or other non-linear or linear distortions in the transmission channel. The distortion effects are estimated from the received signal after the fact or from TWTA characteristics which may be downloaded into the IRD in AM-AM and/or AM-PM maps 1014.

A subtractor 1012 then subtracts the idealized upper layer signal from the stable demodulated signal 1020. This leaves the lower-power second layer signal. The subtractor 1012 may include a buffer or delay function to retain the stable demodulated signal 1020 while the idealized upper layer signal is being constructed. The second layer signal is demodulated by the lower level demodulator 1010 and FEC decoded by decoder 1008 according to its signal format to produce the lower layer symbols, which are provided to a transport module similar to 508 but for the lower layer.

Figure 10B:
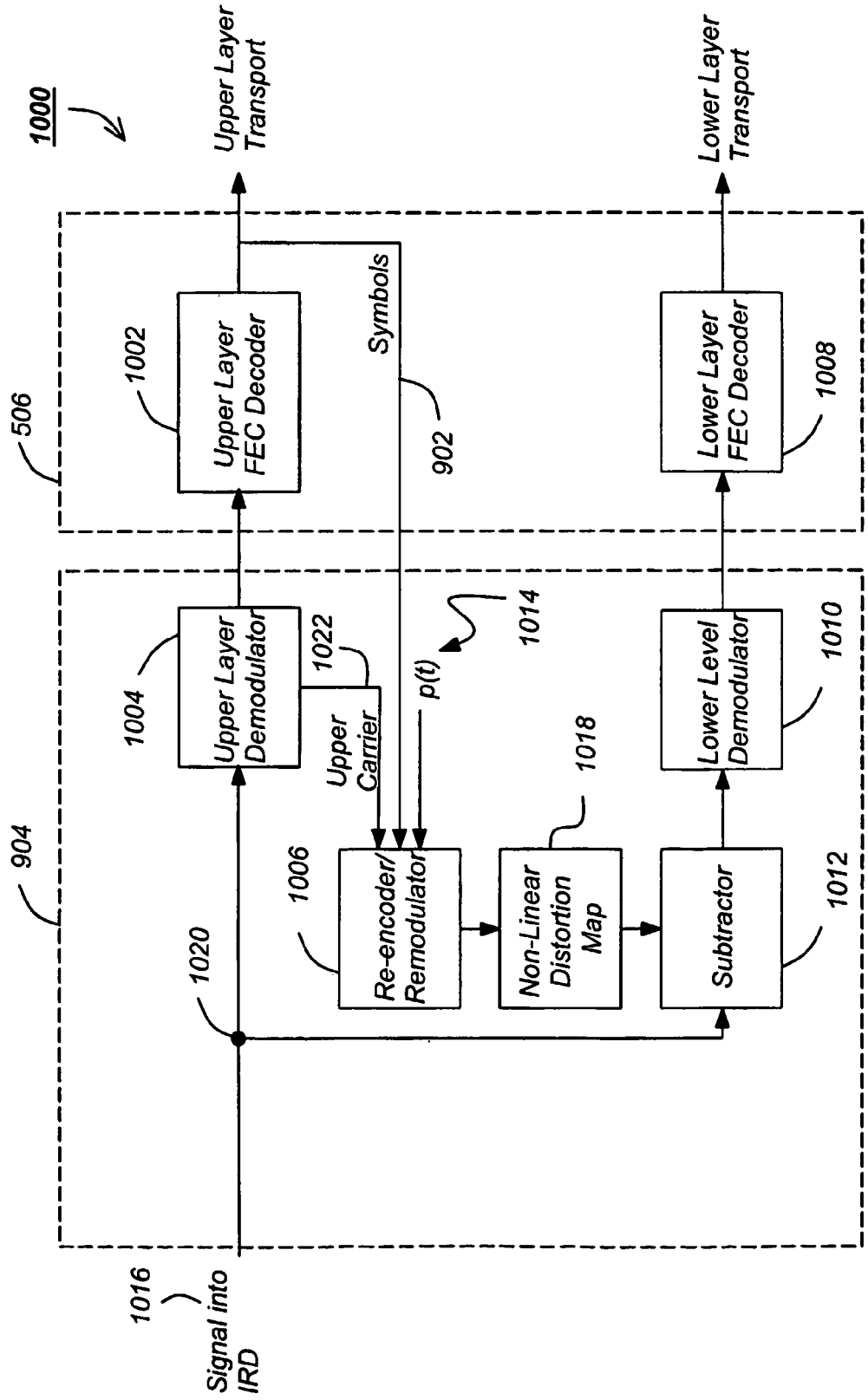
FIG. 10B depicts another embodiment of the enhanced tuner/modulator wherein layer subtraction is performed on the received layered signal.

FIG. 10B depicts another embodiment wherein layer subtraction is performed on the received layered signal. In this case, the upper layer demodulator 1004 produces the upper carrier signal 1022. An upper carrier signal 1022 is provided to the remodulator 1006. The remodulator 1006 provides the remodulated signal to the non-linear distortion mapper 1018 which effectively produces an idealized upper layer signal. Unlike the embodiment shown in FIG. 10A, in this embodiment, the idealized upper layer signal includes the upper layer carrier for subtraction from the received combined signal 416.

Other equivalent methods of layer subtraction will occur to those skilled in the art and the present invention should not be limited to the examples provided here. Furthermore, those skilled in the art will understand that the present invention is not limited to two layers; additional layers may be included. Idealized upper layers are produced through remodulation from their respective layer symbols and subtracted. Subtraction may be performed on either the received combined signal or a demodulated signal. Finally, it is not necessary for all signal layers to be digital transmissions; the lowest layer may be an analog transmission.

The following analysis describes the exemplary two layer demodulation and decoding. It will be apparent to those skilled in the art that additional layers may be demodulated and decoded in a similar manner. The incoming combined signal is represented as:

$$s_{UL}(t) = f_U\left(M_U \exp(j\omega_U t + \theta_U) \sum_{m=-\infty}^{\infty} S_{Um} p(t-mT)\right) +$$

$$f_L\left(M_L \exp(j\omega_L t + \theta_L) \sum_{m=-\infty}^{\infty} S_{Lm} p(t-mT+\Delta T_m)\right) + n(t)$$

where, $M_U$ is the magnitude of the upper layer QPSK signal and $M_L$ is the magnitude of the lower layer QPSK signal and $M_L \ll M_U$. The signal frequencies and phase for the upper and lower layer signals are respectively $\omega_U$, $\theta_U$ and $\omega_U$, $\theta_U$, respectively. The symbol timing misalignment between the upper and lower layers is $\Delta T_m$. The expression p(t-mT) represents the time shifted version of the pulse shaping filter p(t) 430 employed in signal modulation. QPSK symbols $S_{Um}$ and $S_{Lm}$ are elements of $$\left\{\exp\left(j\frac{n\pi}{2}\right), n = 0, 1, 2, 3\right\}.$$

$f_U(\bullet)$ and $f_L(\bullet)$ denote the distortion function of the TWTAs for the respective signals.

Ignoring $f_U(\bullet)$ and $f_L(\bullet)$ and noise n(t), the following represents the output of the demodulator 1004 to the FEC decoder 1002 after removing the upper carrier:

$$s'_{UL}(t) = M_U \sum_{m=-\infty}^{\infty} S_{Um} p(t-mT) +$$

$$M_L \exp\{j(\omega_L - \omega_U)t + \theta_L - \theta_U\} \sum_{m=-\infty}^{\infty} S_{Lm} p(t-mT+\Delta T_m)$$

Because of the magnitude difference between $M_U$ and $M_L$, the upper layer decoder 402 disregards the $M_L$ component of the $s'_{UL}(t)$.

After subtracting the upper layer from $s_{UL}(t)$ in the subtractor 1012, the following remains:

$$s_L(t) = M_L \exp\{j(\omega_L - \omega_U)t + \theta_L - \theta_U\} \sum_{m=-\infty}^{\infty} S_{Lm} p(t-mT+\Delta T_m)$$

Any distortion effects, such as TWTA nonlinearity effects are estimated for signal subtraction. In a typical embodiment of the present invention, the upper and lower layer frequencies are substantially equal. Significant improvements in system efficiency can be obtained by using a frequency offset between layers.

Using the present invention, two-layered backward compatible modulation with QPSK doubles the current legacy system capacity that uses a legacy operating mode with a 6/7 FEC code rate. This capacity increase is enabled by transmitting a backward compatible upper layer carrier through a TWTA that is approximately 6.2 dB above the power used in the legacy system. The new lower layer QPSK signals may be transmitted from a separate transmitter, or from a different satellite for example.

Systems using 16QAM modulation could be designed to provide similar transmission capacity, but this modulation format requires reasonably linear transmitting amplifiers. With layered modulation, separate amplifiers can be used for each layer, and if QPSK signals are used for these layers then these amplifiers can be used in a more efficient non-linear mode. Thus layered modulation eliminates the need for less efficient linear travelling wave tube amplifiers (TWTAS) as are needed for 16QAM. Also, no phase error penalty is imposed on higher order modulations such as 8PSK and 16QAM.

Backward Compatible Applications

Figure 11A:
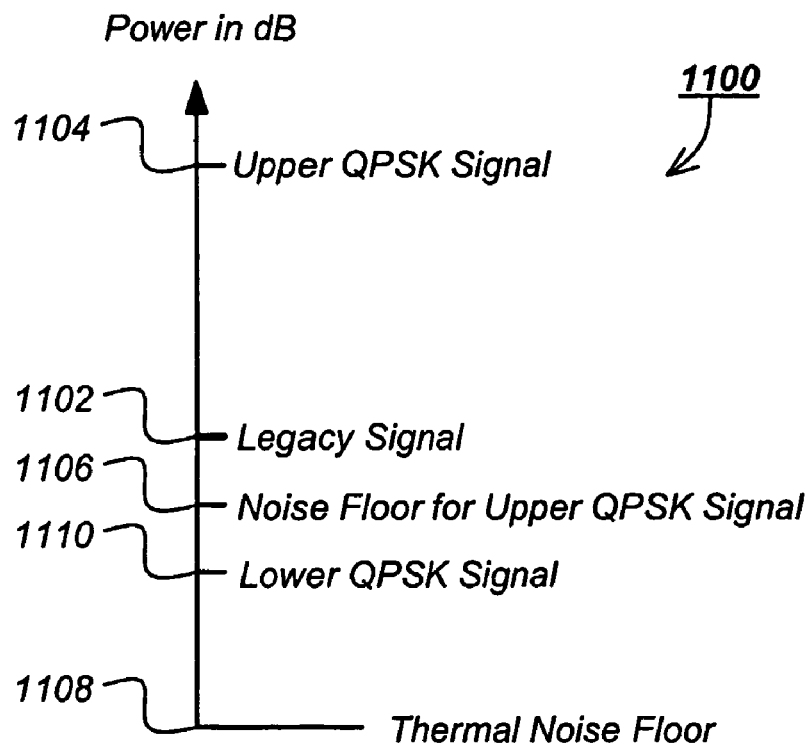
FIGS. 11A and 11B depicts the relative power levels of example embodiments of the present invention.

FIG. 11A depicts the relative power levels 1100 of example embodiments of the present invention without taking into account the effects of rain. Accommodation of rain fade effects comes through the inclusion of clear sky margin in the calculation of transmit power levels, and this is treated in a later section. FIG. 11A is not a scale drawing. This embodiment doubles the pre-existing rate 6/7 capacity by using a TWTA whose power level is 6.2 dB above a pre-existing (legacy) TWTA, and a second TWTA whose power level is 2 dB below that of a pre-existing (legacy) TWTA. This embodiment uses upper and lower QPSK layers which are non-coherent. An FEC code rate of 6/7 is also used for both layers. In this embodiment, the signal of the legacy QPSK signal 1102 is used to generate the upper layer 1104 and a new QPSK layer is the lower layer 1110. The legacy QPSK signal 1102 has a threshold CNR (i.e., the carrier to noise ratio required to achieve acceptable performance) of approximately 7 dB. The new lower QPSK layer 1110 has a threshold CNR of approximately 5 dB. In the present invention, then, the lower QPSK layer transmit power level 1110 is first set so that the received lower layer power is 5 dB above the reference thermal noise power level 1108. Both the thermal noise and the lower layer signal will appear as noise to the upper layer legacy QPSK signal, and this combined noise power must be taken into account when setting the upper layer transmit power level. The combined power of these two noise sources 1106 is 6.2 dB above the reference thermal noise floor 1108. The legacy QPSK signal must then be boosted in power by approximately 6.2 dB above the legacy signal power level 1102 bringing the new power level to approximately 13.2 dB as the upper layer 1104. In this way the combined lower layer signal power and thermal noise power is kept at or below the tolerable noise floor 1106 of the upper layer. It should be noted that the invention may be extended to multiple layers with mixed modulations, coding and code rates.

In an alternate embodiment of this backwards compatible application, an FEC code rate of 2/3 may be used for both the upper and lower layers 1104, 1110. In this case, the threshold CNR of the legacy QPSK signal 1102 (with an FEC code rate of 2/3) is approximately 5.8 dB. The legacy signal 1102 is boosted by approximately 5.3 dB to approximately 11.1 dB (4.1 dB above the legacy QPSK signal 1102 with an FEC code rate of 2/3) to form the upper QPSK layer 1104. The new lower QPSK layer 1110 has a threshold CNR of approximately 3.8 dB. The total signal and noise of the lower layer 1110 is kept at or below approximately 5.3 dB, the tolerable noise floor 1106 of the upper QPSK layer. In this case, the total capacity is 1.55 times that the legacy signal 1102.

In a further embodiment of a backwards compatible application of the present invention the code rates between the upper and lower layers 1104, 1110 may be mixed. For example, the legacy QPSK signal 502 may be boosted by approximately 5.3 dB to approximately 12.3 dB with the FEC code rate unchanged at 6/7 to create the upper QPSK layer 1104. The new lower QPSK layer 1110 may use an FEC code rate of 2/3 with a threshold CNR of approximately 3.8 dB. In this case, the total capacity is 1.78 times that of the legacy signal 1102.

Non-Backward Compatible Applications

As previously discussed the present invention may also be used in "non-backward compatible" applications. In a first example embodiment, two QPSK layers 1104, 1110 are used each at an FEC code rate of 2/3. The upper QPSK layer 504 has a threshold CNR of approximately 4.1 dB above its noise floor 1106 and the lower QPSK layer 1110 also has a threshold CNR of approximately 4.1 dB. The combined power of the thermal noise and the lower QPSK layer 1110 is approximately 5.5 dB above the reference thermal noise level 1108. The CNR for the upper QPSK signal 1104 is then set at approximately 9.6 dB (4.1+5.5 dB), merely 2.4 dB above the legacy QPSK signal rate 6/7. The capacity is then a factor of approximately 1.56 compared to the legacy rate 6/7.

Figure 11B:
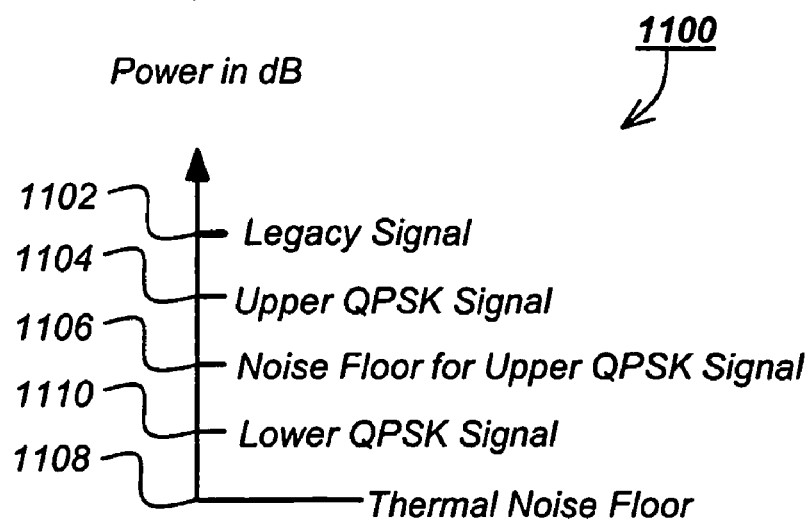

FIG. 11B depicts the relative power levels of an alternate embodiment wherein both the upper and lower layers 1104, 1110 can be below the legacy signal level 1102. The two QPSK layers 1104, 1110 use a code rate of 1/2. The lower and upper QPSK layers have a threshold CNR of approximately 2.0 dB. In this case, the upper QPSK layer 1104 is approximately 2.0 dB above its noise floor 1106 of approximately 4.1 dB. The upper layer signal level of 6.1 dB is lower than the 7.0 dB for the legacy signal. The capacity of this embodiment is a factor of approximately 1.17 compared to the legacy rate 6/7.

Hardware Environment

Figure 12:
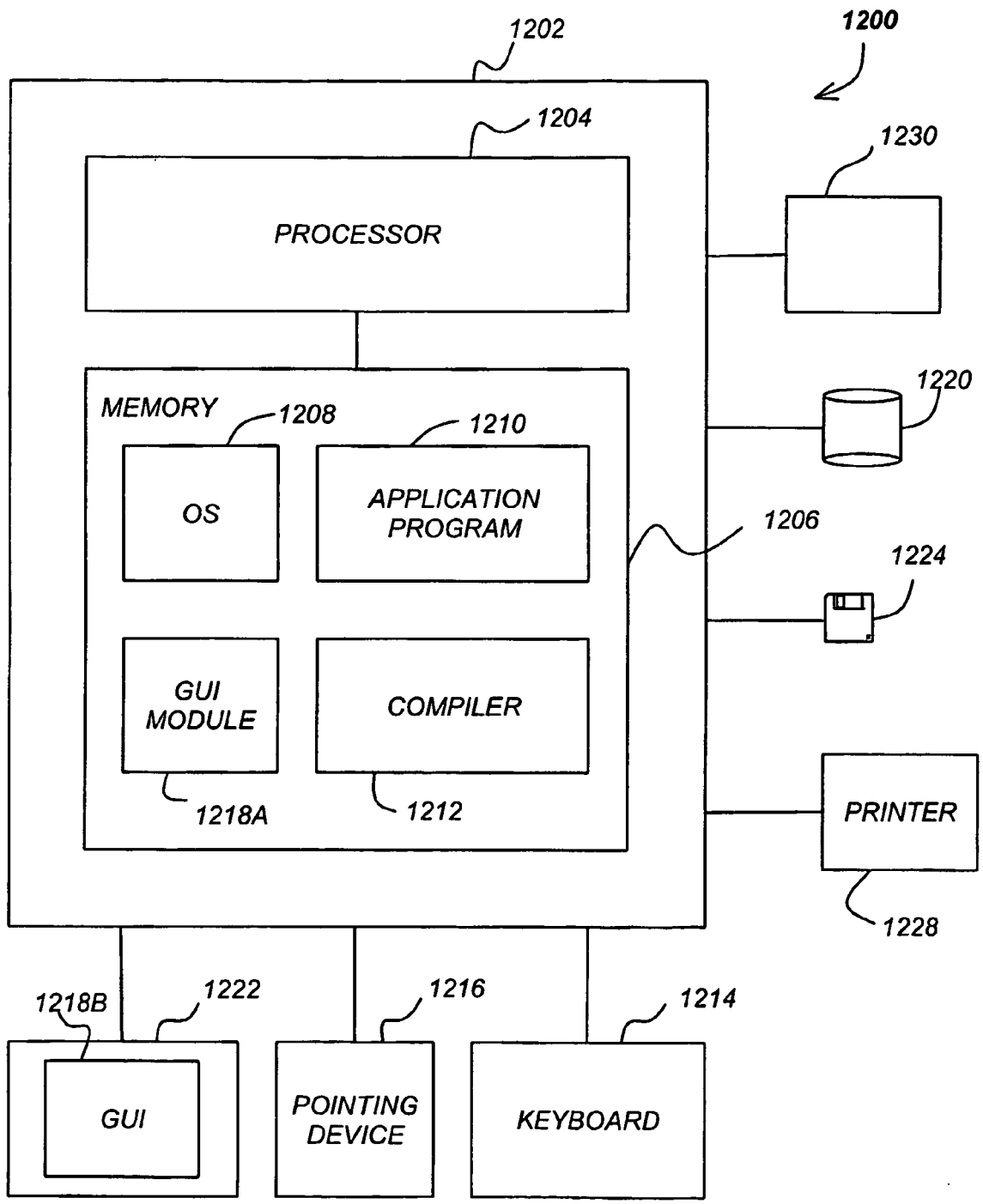
FIG. 12 illustrates an exemplary computer system that could be used to implement selected modules or functions the present invention.

FIG. 12 illustrates an exemplary computer system 1200 that could be used to implement selected modules or functions the present invention. The computer 1202 comprises a processor 1204 and a memory, such as random access memory (RAM) 1206. The computer 1202 is operatively coupled to a display 1222, which presents images such as windows to the user on a graphical user interface 1218B. The computer 1202 may be coupled to other devices, such as a keyboard 1214, a mouse device 1216, a printer, etc. Of course, those skilled in the art will recognize that any combination of the above components, or any number of different components, peripherals, and other devices, may be used with the computer 1202.

Generally, the computer 1202 operates under control of an operating system 1208 stored in the memory 1206, and interfaces with the user to accept inputs and commands and to present results through a graphical user interface (GUI) module 1218A. Although the GUI module 1218A is depicted as a separate module, the instructions performing the GUI functions can be resident or distributed in the operating system 1208, the computer program 1210, or implemented with special purpose memory and processors. The computer 1202 also implements a compiler 1212 which allows an application program 1210 written in a programming language such as COBOL, C++, FORTRAN, or other language to be translated into processor 1204 readable code. After completion, the application 1210 accesses and manipulates data stored in the memory 1206 of the computer 1202 using the relationships and logic that was generated using the compiler 1212. The computer 1202 also optionally comprises an external communication device such as a modem, satellite link, Ethernet card, or other device for communicating with other computers.

In one embodiment, instructions implementing the operating system 1208, the computer program 1210, and the compiler 1212 are tangibly embodied in a computer-readable medium, e.g., data storage device 1220, which could include one or more fixed or removable data storage devices, such as a zip drive, floppy disc drive 1224, hard drive, CD-ROM drive, tape drive, etc. Further, the operating system 1208 and the computer program 1210 are comprised of instructions which, when read and executed by the computer 1202, causes the computer 1202 to perform the steps necessary to implement and/or use the present invention. Computer program 1210 and/or operating instructions may also be tangibly embodied in memory 1206 and/or data communications devices 1230, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Using the techniques described herein, as will be shown later, the clear sky margin required for the upper signal layer 402 is considerably less than the clear sky margin that would be required if the signal were sent by itself. It is also considerably less than that required for the lower signal layer 420. In a rain fade condition, the upper and lower layers fade together. Thus, the primary source of noise for the upper signal layer 402 fades as fast as the upper layer signal itself, allowing for a significantly reduced upper layer clear sky margin. The present invention takes full advantage of this effect. Conversely, the clear sky margin required for the lower layer must be set high enough to account for the fade of the lower layer carrier relative to its primary source of noise, thermal noise, which increases in rain. Hence, the required clear sky margin for the upper signal layer 402 can be reduced when compared to that which is required for the lower signal layer 420. Alternatively or in combination, the technique described below can be used to design a layered modulation system that provides higher availability levels for the upper layer than for the lower layer.

Clear Sky Margin

The distribution of power to the upper and lower layer carriers discussed earlier (FIGS. 11A and 11B) did not consider the affects of rain attenuation on the upper and lower layer signals. These affects can be large, acting to both decrease the desired signal level and to increase the noise level. In the case of layered modulation these effects must be carefully considered for each layer. Additional power is added to each layer to accommodate these rain effects, and this added power is called clear sky margin (CSM). In the technique described below, the design of the upper signal layer 410 takes advantage of the fact that both the lower signal layer 418 and the upper signal layer 410 are attenuated by an equal amount in a rain fade condition. Also, since the upper signal layer 410 must be locked and reconstructed before the lower signal layer 418 can be accurately demodulated, the lower signal layer 418 can be no more "available" in a statistical sense than the upper signal layer 410. In a critical condition where the upper and lower signal layers have exactly the same availability, both signals will drop to their respective operating thresholds simultaneously when the rain attenuation reaches a sufficient value.

Upper and Lower Signal Layers with Equal Availability

Assuming that the clear sky thermal noise level is represented by N, and that the carrier-to-noise threshold level is given by $T_L$ and $T_U$, for the lower and upper signal layers 418, 410, respectively, the threshold levels $T_L$ and $T_U$ can be defined in a number of ways. For purposes of illustration, the analysis that follows assumes that the threshold levels $T_L$ and $T_U$ are quasi-error-free thresholds. This is the operating point where the number of bit errors detected at the output of the forward error correction decoder 506 have dropped to about one error per hour or one error per day.

Assuming for the moment that there is a given link availability requirement, from that value, suitable values for rain attenuation and rain noise can be determined. Defining a parameter $\alpha$ to represent the amount of rain attenuation present ($\alpha <= 1$), and $\beta$ to represent the increase in noise due to atmospheric rain ($\beta >= 1$), both of which are a function of the desired signal availability, the lower signal layer 418 carrier power $C_L$ required to provide the necessary link availability can be determined from the expression:

$$T_L = \frac{\alpha C_L}{\beta N} \qquad \text{Equation (1)}$$

Solving for $C_L$:

$$C_L = \frac{\beta N T_L}{\alpha} \qquad \text{Equation (2)}$$

The values $\alpha$ and $\beta$ are both a function of the desired availability, and are typically defined through the use of rain attenuation models that would be readily known to someone skilled in the art.

A clear sky margin (defined as a ratio between the clear sky carrier to noise-plus-interference ratio and the threshold carrier to noise-plus-interference ratio) can be computed for each layer. For the lower signal layer 418, the clear sky margin $M_L$ becomes:

$$M_L = \frac{C_L}{N T_L} = \frac{\beta}{\alpha} \qquad \text{Equation (3)}$$

The upper signal layer 410 carrier power $C_U$ necessary to provide the required link availability is computed by noting that when the upper signal layer carrier is at a threshold condition, the carrier is attenuated by the factor $\alpha$. The noise term however, contains both the link thermal noise power (increased by the rain) and the lower level carrier power (attenuated by rain). Consequently, the upper layer carrier power $C_L$ necessary to provide the required link availability is defined by the Equation (4) below:

$$T_U = \frac{\alpha C_U}{\beta N + \alpha C_L} \qquad \text{Equation (4)}$$

Using this expression, the required upper level carrier power $C_U$ is described in Equation (5) below.

$$C_U = \frac{(\beta N + \alpha C_L) T_U}{\alpha} \qquad \text{Equation (5)}$$

And the clear sky margin for the upper signal layer 410 becomes $$M_U = \frac{C_U}{N+C_L}\frac{1}{T_U}$$

Equation (6)

$$= \frac{C_U}{N+C_L}\frac{\beta N + \alpha C_L}{\alpha C_U}$$

$$= \frac{\left(\frac{C_L}{N}+\frac{\beta}{\alpha}\right)}{\left(\frac{C_L}{N}+1\right)}$$

Noting that $$\frac{C_L}{N} = \frac{\beta T_L}{\alpha}$$

Equation (7)

The upper signal layer clear sky margin can be written in terms of the lower signal layer threshold as shown in Equation (8) below.

$$M_U = \frac{\frac{\beta}{\alpha}(T_L+1)}{\frac{\beta}{\alpha}\left(T_L+\frac{\alpha}{\beta}\right)} = \frac{(T_L+1)}{\left(T_L+\frac{\alpha}{\beta}\right)}$$

Equation (8)

In a typical application, the values of α might change from −1 to −5 dB and the values for β might range from 2 to 4 dB, depending on the desired availability. Since the lower level clear sky margin is (β-α), when expressed in dB, then it can be seen that typical lower signal layer clear sky margins will range from 3 to 9 dB, depending on the desired availability.

It would ordinarily be expected that the lower signal layer clear sky margin would also be required for the upper signal layer, which would require very high transmitter powers. However, this is not necessary because the upper and lower signal layers fade together in rain, as shown in the derivation for the upper layer clear sky margin in Equation (4) above. Hence, the upper layer clear sky margin depends on the carrier to noise threshold and to a lesser extent on the ratio of α to β. The required upper layer clear sky margin is typically 1 dB or less, and approaches 0 dB with increasing lower signal layer 420 carrier-to-noise threshold.

Figure 13:
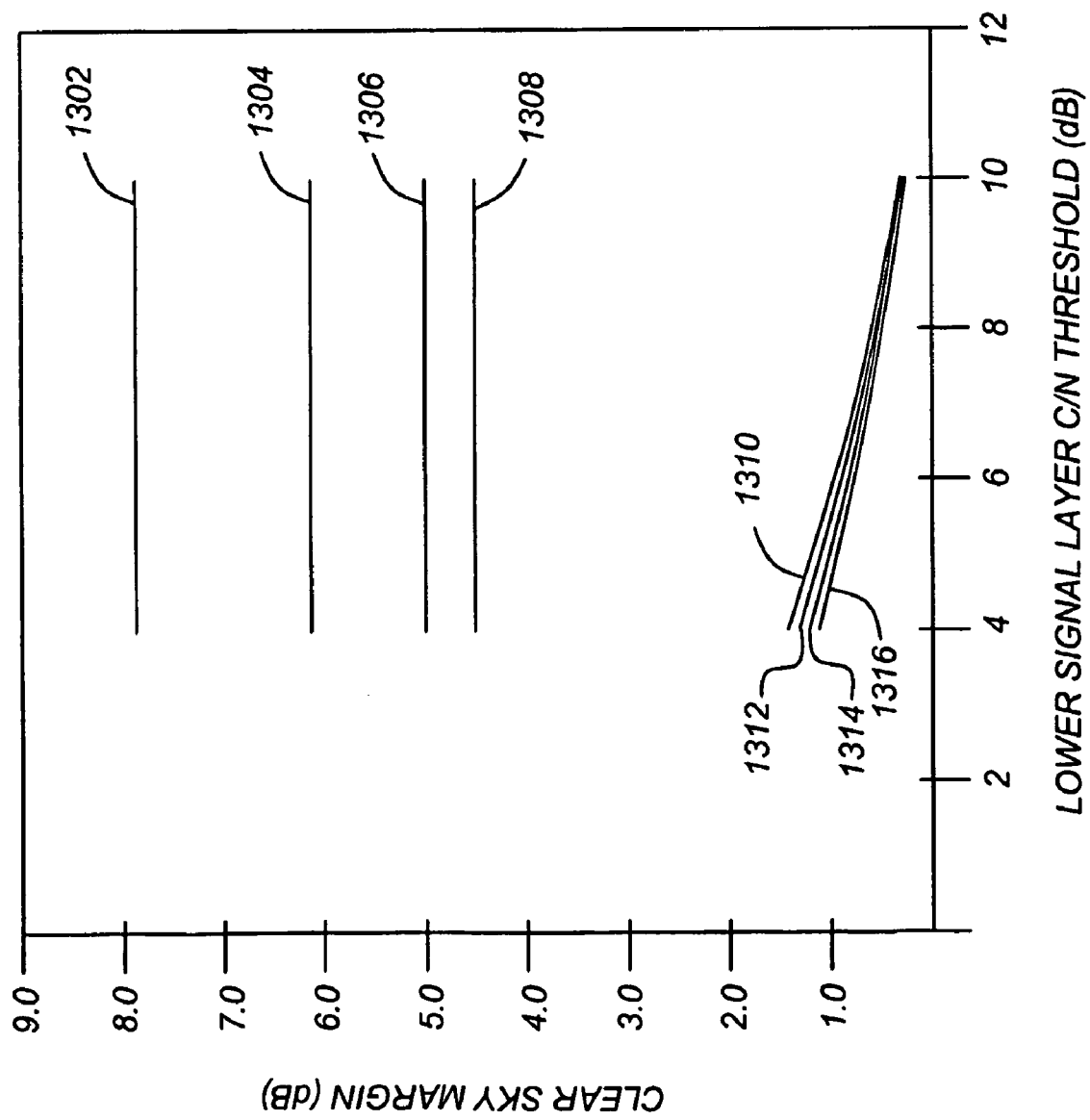
FIG. 13 is a diagram showing both upper and lower signal layer clear sky margins as a function of lower layer threshold and desired availability.

FIG. 13 is a diagram showing both upper and lower signal layer clear sky margins as a function of lower layer threshold and desired availability. Plot 1302 shows the lower layer clear sky margin as a function of the lower signal layer carrier-to-noise ratio threshold for a lower signal layer availability of 99.95%. Plots 1304–1308 show the same for lower signal layer availabilities of 99.90%, 99.85%, and 99.80%, respectively. Plots 1310–1316 show the upper layer clear sky margin for upper signal layer availabilities of 99.95%, 99.90%, 99.85%, and 99.80% respectively. Note in this figure that the upper layer clear sky margins are much less than the lower layer clear sky margins. The smaller clear sky margins for the upper layer are critical to the performance of layered modulation because it lowers the required satellite transmit power of the upper layer carrier.

The ratio of the upper signal layer carrier to thermal noise in clear sky can be computed as a function of α, β, and the upper and lower carrier-to-noise ratios.

Beginning with the relation $$C_U = \frac{(\beta N + \alpha C_L)T_U}{\alpha}$$

Equation (9)

we can obtain $$\frac{C_U}{N} = \frac{\left(\beta + \alpha\frac{C_L}{N}\right)T_U}{\alpha}$$

Equation (10)

$$\frac{C_U}{N} = \frac{\left(\beta + \alpha\frac{\beta}{\alpha}T_L\right)T_U}{\alpha}$$

$$\frac{C_U}{N} = \frac{\beta}{\alpha}(1+T_L)T_U$$

If the lower signal layer 418 were not present (e.g. a legacy signal), the required clear sky carrier to noise ratio would not include the term (1+$T_L$). This added term accounts for the presence of the lower signal layer 418 as interfering noise to the upper signal layer 410. Noting that N refers to the thermal noise only, the total noise plus lower layer interference power seen by the upper signal layer demodulator is dominated by the lower layer signal layer carrier power.

Equation (10) provides a minimum value for $C_U$ relative to the thermal noise for both the upper and lower signal layers to exhibit the same availability. By increasing $C_U$ above this level, the availability of the upper signal layer 410 can be increased over that of the lower signal layer 418.

Figure 14:
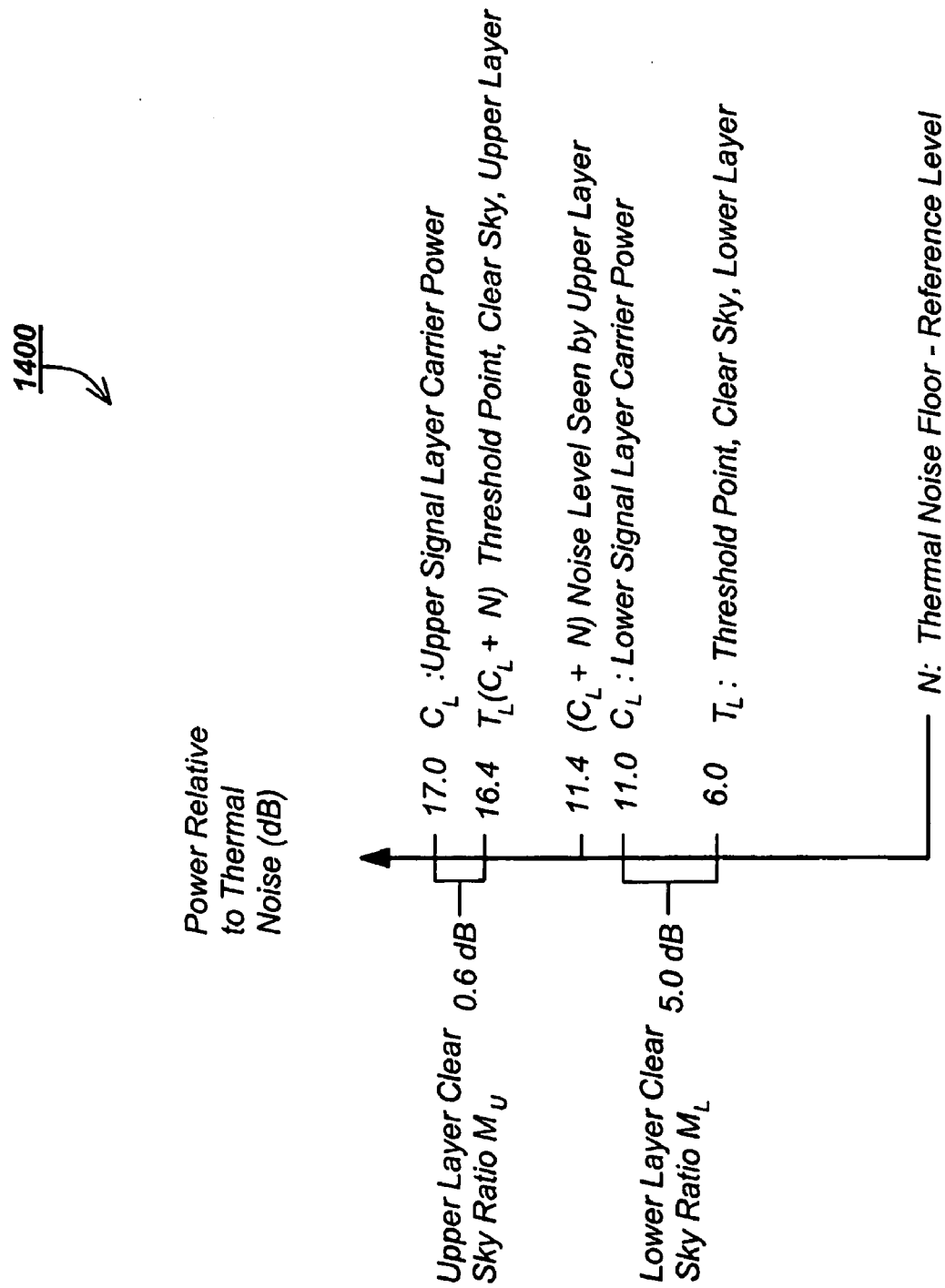
FIG. 14 is an illustration showing exemplary lower and upper signal layer clear sky margins as power levels (dB) relative to thermal noise in clear sky conditions.

FIG. 14 is an illustration showing exemplary lower and upper signal layer clear sky margins as power levels (dB) relative to thermal noise in clear sky conditions. In this example, the lower signal layer carrier-to-noise-plus-interference threshold was set at 6.0 dB, and the upper signal layer carrier-to-noise-plus-interference threshold was set to 5.0 dB. The values for α and β are about −2.0 and +3.0 dB, respectively. Note that the lower signal layer threshold point plus clear sky margin give a clear sky lower layer carrier power of 11.0 dB relative to thermal noise N. The combination of thermal noise and lower signal layer carrier power is 11.4 dB, which is the noise plus interference level seen by the upper signal layer carrier.

Summing (in dB) the upper layer required threshold to the noise-plus-interference value of 5 dB to 11.4 dB gives the upper layer threshold point of 16.4 dB relative to thermal noise N. The required clear sky margin above this point is only 0.6 dB, yet in a rain fade condition, bot the upper and lower signal layers will exhibit the same availability.

Upper and Lower Signal Layer Margins with Improved Upper Layer Availability

The upper and lower signal layers 410, 418 can be designed with different availability objectives a well. As previously noted, the lower signal layer 418 availability cannot be better than the upper signal layer 410 availability, since successful demodulation of the lower signal layer 418 depends on successful demodulation of the upper signal layer 410. However, the upper signal layer 410 can be designed with better availability than the lower signal layer 418 by increasing the upper signal layer margin. As demonstrated below, significant improvements can be made in the upper signal layer 410 availability with only small increases in the upper signal layer 410 margin. This is a significant advantage of the non-coherent layered modulation techniques described herein.

Modifying Equation (1) to differentiate between the parameters α and β for the upper and lower signal layers yields Equation (11) below.

$$T_L = \frac{\alpha_L C_L}{\beta_L N} \qquad \text{Equation (11)}$$

This yields Equations (12) and (13).

$$C_L = \frac{\beta_L N T_L}{\alpha_L} \qquad \text{Equation (12)}$$

$$M_L = \frac{\beta_L}{\alpha_L} \qquad \text{Equation (13)}$$

For improved availability in the upper layer, $$\alpha_U < \alpha_L \qquad \text{Equation (14)}$$

and $$\beta_U > \beta_L. \qquad \text{Equation (15)}$$

Noting that when the upper signal layer 410 is at threshold, the new upper signal layer values for α and β will apply, $$T_U = \frac{\alpha_U C_U}{\beta_U N + \alpha_U C_L}. \qquad \text{Equation (16)}$$

Referring to Equation (5), the new upper signal carrier power becomes $$C_U = \frac{(\beta_U N + \alpha_U C_L) T_U}{\alpha_U}. \qquad \text{Equation (17)}$$

Using Equation (6), the following relationship is derived:

$$M_U = \frac{C_U}{N + C_L} \frac{1}{T_U} \qquad \text{Equation (18)}$$
$$= \frac{C_U}{N + C_L} \frac{\beta_U N + \alpha_U C_L}{\alpha_U C_U}$$
$$= \frac{\left(\frac{C_L}{N} + \frac{\beta_U}{\alpha_U}\right)}{\left(\frac{C_L}{N} + 1\right)}.$$

Using, from Equation (12), $$\frac{C_L}{N} = \frac{\beta_L T_L}{\alpha_L} \qquad \text{Equation (19)}$$

we obtain, $$M_U = \frac{\frac{\beta_U}{\alpha_U} + \frac{\beta_L T_L}{\alpha_L}}{1 + \frac{\beta_L T_L}{\alpha_L}} = \frac{\frac{\alpha_L}{\alpha_U}\beta_U + \beta_L T_L}{\alpha_L + \beta_L T_L} \qquad \text{Equation (20)}$$

Note that Equation (20) reduces to Equation (8) if the availabilities of the upper and lower signal layers are equal (e.g. $\alpha_L = \alpha_U$ and $\beta_L = \beta_U$).

Figure 15:
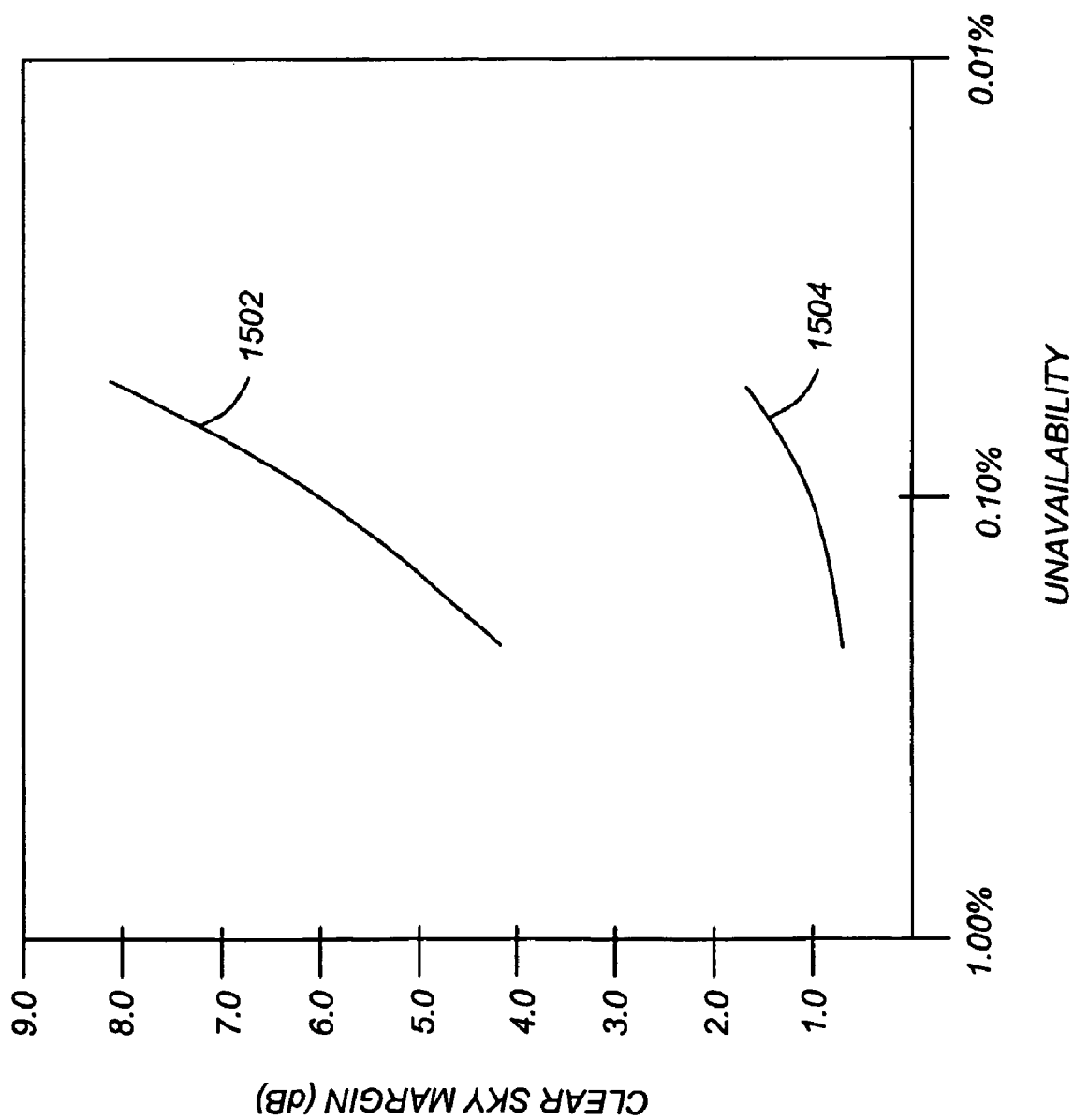
FIG. 15 is a plot showing the clear sky margin as a function of unavailability of the upper signal layer.

FIG. 15 is a plot of Equation (20) as a function of the unavailability of the upper signal layer 410. In this example, the lower level unavailability is 0.02% (since unavailability is (1-availability), this translates to an availability of 99.8%) and the lower signal layer threshold is 6 dB.

As can be seen in the lower curve of FIG. 15, which plots $M_U$, the upper layer clear sky margin defined by (18) or (20), the upper signal layer performance can be improved (e.g. lower unavailability) by increasing the upper signal layer clear sky margin by only 10ths of a dB, as shown in curve 1504. As upper curve 1502 shows, in a conventionally modulated, single-layer satellite link, the clear sky margin would have to be improved by 3 dB to achieve the same performance improvement.

Thus, if one of the signal layers requires higher availability than the other, then that layer must be designated as the upper signal layer. Similarly, if backward compatibility is required, then the signal layer that provides such backward compatibility must be designated as the upper signal layer. Normally, there is no conflict between these requirements, as the backwards-compatible layer is normally also desired to be the higher availability layer. If, however, the non-backwards-compatible layer requires higher availability than the backwards-compatible layer, a conflicting requirement exists. This can be resolved by designing the system such that the availability of the signal layers is equal and at the higher availability value.

Figure 16:
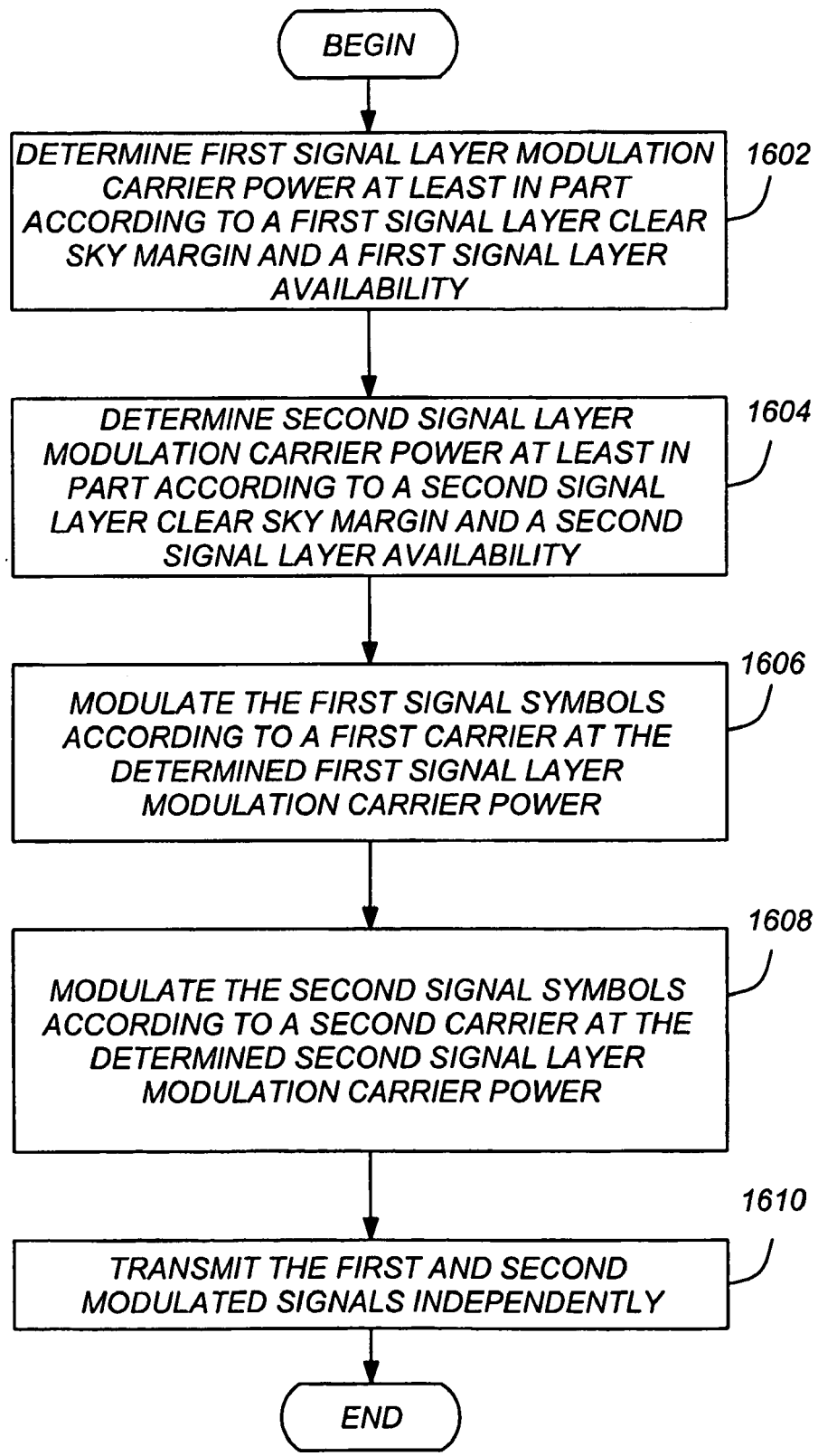
FIG. 16 is a diagram illustrating exemplary method steps that can be used to practice one embodiment of the invention.

FIG. 16 is a diagram illustrating exemplary method steps that can be used to practice one embodiment of the invention. A first signal layer modulation carrier power $C_L$ is determined at least in part according to a first signal layer clear sky margin $M_L$ and a first signal layer availability, as shown in block 1602. In one embodiment, this is accomplished by determining the first level carrier power $C_L$ according to $$C_L = \frac{\beta N T_L}{\alpha},$$

wherein $\beta/\alpha$ is the first layer clear sky margin $M_L$, $\beta$ comprises a value representing an increase in noise of the layered modulation signal due to atmospheric rain, α comprises a value representing rain attenuation of the layered modulation signal, N comprises a value representing clear-sky thermal noise, and $T_L$ comprises a first signal layer carrier-to-noise threshold level. In block 1604, a second signal layer modulation carrier power $C_U$ is determined at least in part according to a second signal layer clear sky margin $M_U$ and a second signal layer availability. In one embodiment, this is accomplished by determining an second level carrier power $C_U$ according to $$C_U = \frac{(\beta N + \alpha C_L) T_U}{\alpha},$$

and wherein the second layer clear sky margin $$M_U = \frac{(T_L + 1)}{\left(T_L + \frac{\alpha}{\beta}\right)}$$

and $T_U$ comprises a second signal layer carrier-to-noise threshold level. Next, the first signal symbols are modulated according to a first carrier at the determined first signal layer modulation carrier power, as shown in block 1606. Then the second signal symbols are modulated according to a second carrier at the determined second signal layer modulation carrier power, as shown in block 1608. The modulated first and second signals are then transmitted independently to the satellite, as shown in block 1610.

In one embodiment wherein the first signal layer availability and the second signal availability are substantially equal (e.g. $\alpha_L \approx \alpha_U$ and $\beta_L \approx \beta_U$), the second signal layer clear sky margin $M_U$ is less than the first signal layer clear sky margin $M_L$. In another embodiment, the second signal layer availability is greater than the first signal layer availability ($\alpha_U < \alpha_L$ and $\beta_U > \beta_L$, for example), and the second signal layer clear sky margin $M_U$ equals $$\frac{\frac{\beta_U}{\alpha_U} \beta_U + \beta_L T_L}{\alpha_L + \beta_L T_L},$$

wherein $\alpha_U$ at least partially represents the rain attenuation of the second modulation carrier, $\alpha_L$ at least partially represents the rain attenuation of the first layer modulation carrier, $\beta_U$ at least partially represents the additional noise in the second modulation carrier due to rain, and $\beta_L$ at least partially represents the additional noise in the first modulation carrier due to rain.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. For example, it is noted that the uplink configurations depicted and described in the foregoing disclosure can be implemented by one or more hardware modules, one or more software modules defining instructions performed by a processor, or a combination of both.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of transmitting a layered modulation signal having a first signal layer having first signal symbols and a second signal layer having second signal symbols, comprising the steps of:
   determining a first signal layer modulation carrier power $C_L$ at least in part according to a first signal layer clear sky margin $M_L$ and a first signal layer availability;
   determining an second signal layer modulation carrier power $C_U$ at least in part according to an second signal layer clear sky margin $M_U$ and an second signal layer availability;
   modulating the first signal symbols according to a first carrier at the determined first signal layer modulation carrier power;
   modulating the second signal symbols according to a second carrier at the determined second signal layer modulation carrier power to generate the layered modulation signal;
   transmitting the modulated first signal symbols and second signal symbols; and
   wherein the second signal layer clear sky margin is less than the first signal layer clear sky margin when the first signal layer availability and the second signal layer availability are substantially equal.

2. The method of claim 1, wherein the modulated first signal symbols and the modulated second signal symbols are independently transmitted.

3. The method of claim 1, wherein the first signal layer is transmitted on a different frequency range than the second signal layer.

4. The method of claim 1, wherein:
   the step of determining the first signal layer modulation carrier power $C_L$ at least in part according to a first layer clear sky margin $M_L$ and a first layer availability comprises the step of determining a first level carrier power $C_L$ according to $$C_L = \frac{\beta N T_L}{\alpha},$$

wherein $\beta/\alpha$ is the first layer clear sky margin $M_L$, $\beta$ comprises a value representing an increase in noise of the layered modulation signal due to atmospheric rain, $\alpha$ comprises a value representing rain attenuation of the layered modulation signal, N comprises a value representing clear-sky thermal noise, and $T_L$ comprises a first signal layer carrier-to-noise threshold level; and
   the step of determining the second signal layer modulation carrier power $C_U$ at least in part according to an second layer clear sky margin $M_U$ and a second layer availability comprises the step of determining an second level carrier power $C_U$ according to $$C_U = \frac{(\beta N + \alpha C_L) T_U}{\alpha},$$

and wherein the second layer clear sky margin $$M_U = \frac{(T_L + 1)}{\left(T_L + \frac{\alpha}{\beta}\right)}$$

and $T_U$ comprises a second signal layer carrier-to-noise threshold level.

5. The method of claim 1, wherein:
the first signal symbols are modulated according to a first carrier;
the second signal symbols are modulated according to a second carrier; and
wherein the first carrier is randomly phased with respect to the second carrier.

6. The method of claim 5, further comprising the steps of:
demodulating and decoding the second signal layer to produce the second signal symbols;
re-encoding and remodulating the second signal symbols and subtracting the re-encoded and remodulated second signal symbols from the layered modulation signal to produce the first signal layer; and
demodulating the first signal layer to produce the first signal symbols.

7. A method of transmitting a layered modulation signal having a first signal layer having first signal symbols and a second signal layer having second signal symbols, comprising the steps of:
determining a first signal layer modulation carrier power $C_L$ at least in part according to a first signal layer clear sky margin $M_L$ and a first signal layer availability;
determining an second signal layer modulation carrier power $C_U$ at least in part according to an second layer clear sky margin $M_U$ and an second signal layer availability;
modulating the first signal symbols according to a first carrier at the determined first signal layer modulation carrier power;
modulating the second signal symbols according to a second carrier at the determined second signal layer modulation carrier power;
transmitting the modulated first signal symbols and the modulated second signal symbols; and
wherein the second signal layer availability is greater than the first signal layer availability and the second signal layer clear sky margin $M_U$ equals $$\frac{\frac{\beta_U}{\alpha_U}\beta_U + \beta_L T_L}{\alpha_L + \beta_L T_L},$$

wherein $\alpha_U$ at least partially represents the rain attenuation of the second modulation carrier, $\alpha_L$ at least partially represents the rain attenuation of the first layer modulation carrier, $\beta_U$ at least partially represents the additional noise in the second modulation carrier due to rain, and $\beta_L$ at least partially represents the additional noise in the first modulation carrier due to rain.

8. The method of claim 7, wherein the modulated first signal symbols and the modulated second signal symbols are independently transmitted.

9. The method of claim 7, wherein $\alpha_U < \alpha_L$ and $\beta_U > \beta_L$.

10. The method of claim 7, wherein the first signal layer is transmitted on a different frequency range than the second signal layer.

11. The method of claim 7, wherein:
the first signal layer is modulated according to a first carrier;
the second signal layer is modulated according to a second carrier; and
wherein the first carrier is randomly phased with respect to the second carrier.

12. The method of claim 11, further comprising the steps of:
demodulating the second carrier and decoding the second layer to produce the second signal symbols;
re-encoding and remodulating the second signal symbols and subtracting the recoded and remodulated second signal symbols from the layered modulation signal to produce the first signal layer; and
demodulating the first carrier and decoding the demodulated first carrier to produce the first signal symbols.

13. An apparatus for transmitting a layered modulation signal having a first signal layer having first signal symbols and a second signal layer having second signal symbols, comprising:
means for determining a first signal layer modulation carrier power $C_L$ at least in part according to a first signal layer clear sky margin $M_L$ and a first signal layer availability;
means for determining an second signal layer modulation carrier power $C_U$ at least in part according to an second signal layer clear sky margin $M_U$ and an second signal layer availability;
means for modulating the first signal symbols according to a first carrier at the determined first signal layer modulation carrier power;
means for modulating second signal symbols according to a second carrier at the determined second signal layer modulation carrier power to generate the second signal layer;
means for transmitting the modulated first signal symbols and the modulated second signal symbols; and
wherein the second signal layer clear sky margin is less than the first signal layer clear sky margin when the first signal layer availability and the second signal layer availability are substantially equal.

14. The apparatus of claim 13, wherein the modulated first signal symbols and the modulated second signal symbols are independently transmitted.

15. The apparatus of claim 13, wherein the second signal layer modulation is an upper modulation layer and the first signal layer modulation layer is a lower modulation layer.

16. The apparatus of claim 15, wherein:
the means for determining the first signal layer modulation carrier power $C_L$ at least in part according to a first layer clear sky margin $M_L$ and a first layer availability comprises means for determining a first level carrier power $C_L$ according to $$C_L = \frac{\beta N T_L}{\alpha},$$

wherein $\beta/\alpha$ is the first layer clear sky margin $M_L$, $\beta$ comprises a value representing an increase in noise of the layered modulation signal due to atmospheric rain, $\alpha$ comprises a value representing rain attenuation of the layered modulation signal, N comprises a value representing clear-sky thermal noise, and $T_L$ comprises a first signal layer carrier-to-noise threshold level; and the means for determining the second signal layer modulation carrier power $C_U$ at least in part according to an second layer clear sky margin $M_U$ and a second layer availability comprises means for determining an second level carrier power $C_U$ according to $$C_U = \frac{(\beta N + \alpha C_L)T_U}{\alpha},$$

and wherein the second layer clear sky margin $$M_U = \frac{(T_L + 1)}{\left(T_L + \frac{\alpha}{\beta}\right)}$$

and $T_U$ comprises a second signal layer carrier-to-noise threshold level.

17. The apparatus of claim 13, wherein:
the first signal symbols are modulated according to a first carrier;
the second signal symbols are modulated according to a second carrier; and
wherein the first carrier is randomly phased with respect to the second carrier.

18. The apparatus of claim 17, further comprising:
means for demodulating and decoding the second signal layer to produce the second signal symbols;
means for re-encoding and remodulating the second signal symbols and subtracting the re-encoded and remodulated second signal symbols from the layered modulation signal to produce the first signal layer; and
means for demodulating and decoding the first signal layer to produce the first signal symbols.

19. An apparatus for transmitting a layered modulation signal having a first signal layer having first signal symbols and a second signal layer having second signal symbols, comprising:
means for determining a first signal layer modulation carrier power $C_L$ at least in part according to a first signal layer clear sky margin $M_L$ and a first signal layer availability;
means for determining an second signal layer modulation carrier power $C_U$ at least in part according to an second layer clear sky margin $M_U$ and an second signal layer availability;
means for modulating the first signal symbols according to a first carrier at the determined first signal layer modulation carrier power;
means for modulating the second signal symbols according to a second carrier at the determined second signal layer modulation carrier power to generate the second modulated signal;
means for transmitting the modulated first signal symbols and the modulated second signal symbols; and
wherein the second signal layer availability is greater than the first signal layer availability and the second signal layer clear sky margin $$M_U = \frac{\frac{\beta_U}{\alpha_U}\beta_U + \beta_L T_L}{\alpha_L + \beta_L T_L},$$

wherein $\alpha_U$ at least partially represents the rain attenuation of the second modulation carrier, $\alpha_L$ at least partially represents the rain attenuation of the first layer modulation carrier, $\beta_U$ at least partially represents the additional noise in the second modulation carrier due to rain, and $\beta_L$ at least partially represents the additional noise in the first modulation carrier due to rain.

20. The apparatus of claim 19, wherein the modulated first signal symbols and the modulated second signal symbols are independently transmitted.

21. The apparatus of claim 19, wherein $\alpha_U < \alpha_L$ and $\beta_U > \beta_L$.

22. The apparatus of claim 19, wherein the first signal layer is transmitted on a different frequency range than the second signal layer.

23. The apparatus of claim 19, wherein:
the first signal layer is modulated according to a first carrier;
the second signal layer is modulated according to a second carrier; and
wherein the first carrier is randomly phased with respect to the second carrier.

24. The apparatus of claim 23, further comprising:
means for demodulating and decoding the second carrier and decoding the second layer to produce the second signal symbols;
means for re-encoding and remodulating the second signal symbols and subtracting the re-encoded remodulated second signal symbols from the layered modulation signal to produce the first signal layer; and
means for demodulating the first carrier and decoding the demodulated first carrier to produce the first signal symbols.

25. An apparatus for transmitting a layered modulation signal having a first signal layer having first signal symbols and a second signal layer having second signal symbols, comprising:
a processor for determining a first signal layer modulation carrier power $C_L$ at least in part according to a first signal layer clear sky margin $M_L$ and a first signal layer availability, and for determining an second signal layer modulation carrier power $C_U$ at least in part according to an second signal layer clear sky margin $M_U$ and an second signal layer availability;
a modulator, communicatively coupled to the processor, the modulator for modulating the first signal symbols according to a first carrier at the determined first signal layer modulation carrier power;
a second modulator, communicatively coupled to the processor, the second modulator for modulating second signal symbols according to a second carrier at the determined second signal layer modulation carrier power to generate the second signal layer;
at least one transmitter, communicatively coupled to the modulator and the second modulator, the at least one transmitter for transmitting the modulated first signal symbols and the modulated second signal symbols; and
wherein the second signal layer clear sky margin is less than the first signal layer clear sky margin when the first signal layer availability and the second signal layer availability are substantially equal.

26. The apparatus of claim 25, wherein the modulated first signal symbols and the modulated second signal symbols are independently transmitted.

27. The apparatus of claim 25, wherein the second signal layer modulation is an upper modulation layer and the first signal layer modulation layer is a lower modulation layer.

28. The apparatus of claim 27, wherein the processor comprises:
a module for determining a first level carrier power $C_L$ according to $$C_L = \frac{\beta N T_L}{\alpha},$$

wherein $\beta/\alpha$ is the first layer clear sky margin $M_L$, $\beta$ comprises a value representing an increase in noise of the layered modulation signal due to atmospheric rain, $\alpha$ comprises a value representing rain attenuation of the layered modulation signal, N comprises a value representing clear-sky thermal noise, and $T_L$ comprises a first signal layer carrier-to-noise threshold level; and
a second module for determining an second level carrier power $C_U$ according to $$C_U = \frac{(\beta N + \alpha C_L) T_U}{\alpha},$$

and wherein the second layer clear sky margin $$M_U = \frac{(T_L + 1)}{\left(T_L + \frac{\alpha}{\beta}\right)}$$

and $T_U$ comprises a second signal layer carrier-to-noise threshold level.

29. The apparatus of claim 25, wherein:
the first signal symbols are modulated according to a first carrier;
the second signal symbols are modulated according to a second carrier; and
wherein the first carrier is randomly phased with respect to the second carrier.

30. The apparatus of claim 29, further comprising:
a demodulator for demodulating the second layer signal;
a decoder, communicatively coupled to the decoder, for decoding the demodulated second signal layer to produce the second signal symbols;
a re-encoder, communicatively coupled to the decoder, the re-encoder for re-encoding the second signal symbols
a modulator, communicatively coupled to the re-encoder, the modulator for remodulating the re-encoded second signal symbols;
a differencer, communicatively coupled to the modulator, for subtracting the re-encoded and remodulated second signal symbols from the layered modulation signal to produce the first signal layer; and
a second demodulator, for demodulating and decoding the first signal layer to produce the first signal symbols.

31. An apparatus for transmitting a layered modulation signal having a first signal layer having first signal symbols and a second signal layer having second signal symbols, comprising:
a processor, for determining a first signal layer modulation carrier power $C_L$ at least in part according to a first signal layer clear sky margin $M_L$ and a first signal layer availability, and for determining an second signal layer modulation carrier power $C_U$ at least in part according to an second layer clear sky margin $M_U$ and an second signal layer availability;
a modulator, communicatively coupled to the processor, the modulator for modulating the first signal symbols according to a first carrier at the determined first signal layer modulation carrier power;
a second modulator, communicatively coupled to the processor, the second modulator for modulating the second signal symbols according to a second carrier at the determined second signal layer modulation carrier power to generate the second modulated signal;
at least one transmitter, communicatively coupled to the second modulator, the second modulator for transmitting the modulated first signal symbols and the modulated second signal symbols; and
wherein the second signal layer availability is greater than the first signal layer availability and the second signal layer clear sky margin $$M_U = \frac{\frac{\beta_U}{\alpha_U} \beta_U + \beta_L T_L}{\alpha_L + \beta_L T_L},$$

wherein $\alpha_U$ at least partially represents the rain attenuation of the second modulation carrier, $\alpha_L$ at least partially represents the rain attenuation of the first layer modulation carrier, $\beta_U$ at least partially represents the additional noise in the second modulation carrier due to rain, and $\beta_L$ at least partially represents the additional noise in the first modulation carrier due to rain.

32. The apparatus of claim 31, wherein the modulated first signal symbols and the modulated second signal symbols are independently transmitted.

33. The apparatus of claim 31, wherein $\alpha_U < \alpha_L$ and $\beta_U > \beta_L$.

34. The apparatus of claim 31, wherein the first signal layer is transmitted on a different frequency range than the second signal layer.

35. The apparatus of claim 31, wherein:
the first signal layer is modulated according to a first carrier;
the second signal layer is modulated according to a second carrier; and
wherein the first carrier is randomly phased with respect to the second carrier.

36. The apparatus of claim 35, further comprising:
a demodulator, for demodulating and decoding the second carrier and decoding the second layer to produce the second signal symbols;
a re-encoder, for re-encoding the second signal symbols;
a modulator, communicatively coupled to the re-encoder, the modulator for re-modulating the second signal symbols;
a differencer, communicatively coupled to the modulator, for subtracting the re-encoded remodulated second signal symbols from the layered modulation signal to produce the first signal layer; and
a second demodulator, communicatively coupled to the differencer, the second demodulator for demodulating the first carrier and decoding the demodulated first carrier to produce the first signal symbols.

37. The apparatus of claim 31, wherein the first signal layer is transmitted on a different frequency range than the second signal layer.

* * * * *